United States Patent [19]

Nonaka et al.

[11] Patent Number: 4,772,968
[45] Date of Patent: Sep. 20, 1988

[54] RANDOM-ACCESS VIDEO TAPE CASSETTE STORAGE AND PLAYBACK APPARATUS

[75] Inventors: Wataru Nonaka; Junichi Saiki; Takashi Ohtsuka; Yoshinari Moriya, all of Kanagawa, Japan

[73] Assignee: Sony Corporation, Tokyo, Japan

[21] Appl. No.: 942,705

[22] Filed: Dec. 17, 1986

[30] Foreign Application Priority Data

Dec. 20, 1985 [JP] Japan .................... 60-287271

[51] Int. Cl.⁴ ............................................. G11B 15/68
[52] U.S. Cl. ......................................................... 360/92
[58] Field of Search ....................................... 360/92, 91

[56] References Cited

U.S. PATENT DOCUMENTS

| 3,715,040 | 2/1973 | Polus et al. | 242/181 |
| 3,831,197 | 8/1974 | Beach et al. | 360/92 |

FOREIGN PATENT DOCUMENTS

| 56-019551 | 2/1981 | Japan | 360/92 |
| 56-080848 | 7/1981 | Japan | 360/92 |
| 60-182047 | 9/1985 | Japan | 360/92 |
| 1444428 | 7/1976 | United Kingdom | 360/92 |

OTHER PUBLICATIONS

Larson et al., "Random-Access Record Storage," *IBM Technical Disclosure Bulletin*, vol. 15, No. 4, Sep. 1972, pp. 1202-1203.

*Primary Examiner*—John H. Wolff
*Assistant Examiner*—Matthew J. Bussan
*Attorney, Agent, or Firm*—Alvin Sinderbrand

[57] ABSTRACT

An automatic tape cassette loading device is composed of a plurality of cassette storage shelf blocks arranged side-by-side and each including plural tiers of cassette storage compartments for containing respective tape cassettes, a cassette transfer device associated with each of the cassette storage shelf blocks and adapted to perform tape cassette inserting and removing operations in respect to each of the cassette storage compartments of the respective cassette storage shelf block and transferring of tape cassettes over the extent of the respective cassette storage shelf block, a video tape recorder housing block mounted adjacent an end of the side-by-side arrangement of the cassette storage shelf blocks and containing at least one video tape recorder adapted to at least reproduce the signals recorded in a tape cassette delivered thereto from one of the cassette storage shelf blocks, and cassette delivery units provided between the adjoining side-by-side cassette storage shelf blocks and between the video tape recorder housing block and the cassette storage shelf block adjacent thereto and adapted to perform delivery operations of the tape cassettes between the respective blocks. Each of the cassette storage shelf blocks is desirably comprised of two storage shelf portions which are spaced apart to define an aisle therebetween in which the respective cassette transfer device is movable for servicing cassette storage compartments in both shelf portions.

11 Claims, 29 Drawing Sheets

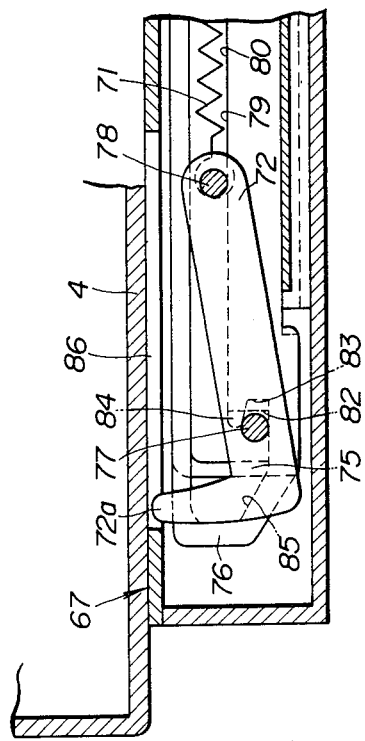
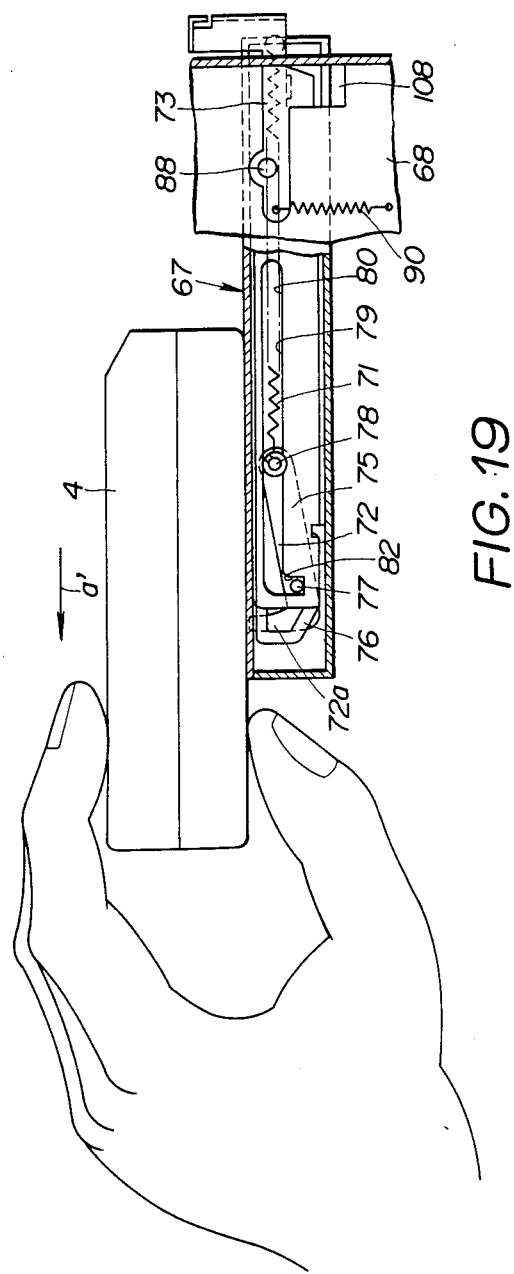
FIG.18E
FIG.19

RANDOM-ACCESS VIDEO TAPE CASSETTE STORAGE AND PLAYBACK APPARATUS

BACKGROUND OF THE INVENTION

1. Field of the Invention

This invention relates to an automatic tape cassette selecting and loading device adapted for sequential and selective loading of a large number of tape cassettes into video tape recorders operable in at least the reproducing mode with a view to achieving continuous video reproduction for an extended period of time.

2. Description of the Prior Art

There has been used in, for example, a broadcasting station, an automatic cassette loading device in which a large number of tape cassettes are automatically selectively loaded in sequence into a video tape recorder, heretofore abbreviated to VTR, in order to perform a continuous video reproducing and/or video recording for an extended time.

A known automatic cassette loading device of this type, for example, as shown in FIGS. 1, 2 and 3, comprises a vertical cassette storage rack 352 containing a large number of tape cassettes 351. On the back side of cassette storage rack 352 is disposed a cassette transfer unit 353, and in back of the latter are arranged, in vertical tiers, a plurality of VTRs 354 each operable in at least the reproducing mode. The cassette storage rack 352 is formed by cassette storing shelf sections 355 for storing the tape cassettes 351 in vertical tiers and horizontal rows. The cassette transfer unit 353 is designed to be moved along these numerous cassette storing shelf sections 355 between the cassette storage rack 352 and the VTR 354 in the vertical direction (indicated by an arrow Y) or in the horizontal direction (indicated by an arrow X).

As shown in FIGS. 2 and 3, the cassette transfer unit 353 has a lower cassette transfer passage 356 and an upper cassette transfer passage 357. During loading of a cassette into a VTR 354, a tape cassette 351 is charged into transfer passage 356 of transfer unit 353 from within a selected cassette storing shelf section 352 in the direction of an arrow a, as shown in FIG. 2. The cassette transfer unit 353 is then moved in the direction of an arrow b to a particular VTR 354, and the tape cassette 351 is then discharged in the direction of an arrow c so as to be loaded from within transfer passage 356 into registered VTR 354. When taking the cassette out of the VTR 354, the tape cassette 351 is fed in the direction of an arrow c' (FIG. 3) from the VTR 354 into the other or upper cassette transfer passage 357 of the cassette transfer unit 353, and the cassette transfer unit 353 is then moved in the direction of an arrow b' to the original cassette storing shelf section 355 of the cassette storage rack 352, whereupon the tape cassette 351 is returned in the direction of an arrow a' from cassette transfer passage 357 into the original cassette storing shelf section 355, as shown in FIG. 3.

In the above described conventional automatic cassette loading device, the cassette storage rack 352 for storing the tape cassettes 351, the cassette transfer unit 353 and the VTRs 354 arranged in plural tiers, are grouped together into a single device. For this reason, it is necessary to increase the size of the cassette storage rack 352 if it is desired to increase the storable number of tape cassettes 351.

However, if the size of the cassette storage rack 352 is increased to increase the storable number of tape cassettes 351, a prolonged operating time is required for effecting the operations incident to exchanging the tape cassette disposed in each VTR. More particularly, when the size of rack 352 is increased, increased times are required for seeking out a specified cassette 351 in rack 352, loading the cassette into a VTR 354, and returning cassettes from other VTRs to the respective shelf sections 355 of rack 352. The result is that it becomes difficult to achieve continuous or uninterrupted video reproduction by using plural VTRs 354. More particularly, since the VTRs 354 are used at broadcasting stations by switching from one to another of the VTRs 354 at intervals comprised of tens of seconds, it becomes impossible to effect continuous video reproduction when the operating time for exchanging the cassettes in such VTRs is prolonged.

In addition, when the size of cassette storage rack 352 is increased, the overall device is enlarged in size, so that difficulties are presented in its transportation and installation. Further, the known device is not adaptable to being arranged in block form for assembly of the several blocks at the site of eventual use.

OBJECTS AND SUMMARY OF THE INVENTION

Accordingly, it is an object of the present invention to provide an automatic tape cassette loading device free of the above described disadvantages of the prior art device.

More specifically, it is an object of this invention to provide an automatic tape cassette loading device of increased tape cassette storage capacity without prolonging the time required for exchanging the cassette in a VTR, so that video reproducing and/or recording operations of short durations can be effected without interruption by means of a relatively smaller number of VTRs.

It is another object of the present invention to provide an automatic tape cassette loading device wherein the cassette storage shelves are arranged in block form so that the number of cassette storage shelves can be optionally increased or reduced merely by increasing or decreasing the number of blocks to permit any desired number of tape cassettes to be stored in one storage rack.

In accordance with an aspect of this invention, an automatic tape cassette loading device comprises a plurality of cassette storage shelf blocks arranged side-by-side and each including plural tiers of cassette storage compartments for containing respective tape cassettes; a cassette transfer device associated with each of said cassette storage shelf blocks and adapted to perform tape cassette inserting and removing operations in respect to each of the cassette storage compartments of the respective cassette storage shelf block and transferring of tape cassettes over the extent of the respective cassette storage shelf block; a video tape recorder housing block mounted adjacent an end of the side-by-side arrangement of the cassette storage shelf blocks and containing at least one video tape recorder adapted to at least reproduce the signals recorded in a tape cassette delivered thereto from one of the cassette storage shelf blocks; and cassette delivery units provided between the adjoining side-by-side cassette storage shelf blocks and between the video tape recorder housing block and the cassette storage shelf block adjacent thereto and adapted to perform delivery operations of the tape cassettes between the respective blocks.

The above, and other objects, features and advantages of the invention, will be apparent in the following detailed description thereof which is to be read in connection with the accompanying drawings, in which the same parts and components are identified by the same reference numerals in the several views.

BRIEF DESCRIPTION OF THE DRAWINGS

FIGS. 18A-18E, are detailed sectional views to which reference will be made in explaining the operation of the push-out device associated with each storage compartment;

FIG. 19 is a side elevational view, partly in section, and illustrating the manual removal of a tape cassette from a storage compartment;

DETAILED DESCRIPTION OF A PREFERRED EMBODIMENT

General Arrangement of Device

Figure 1:
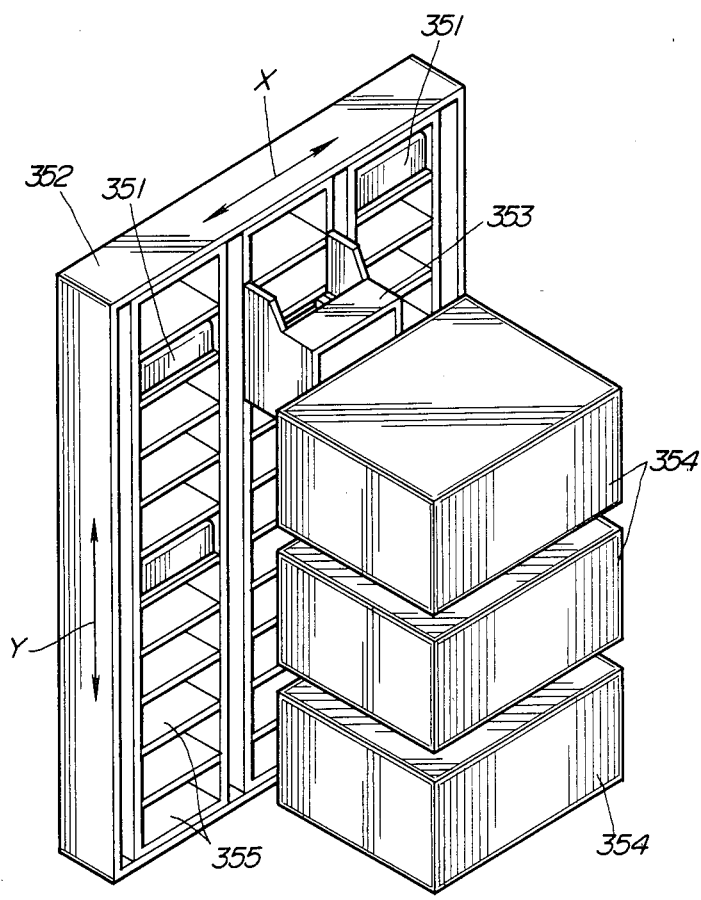
FIG. 1 is a perspective view showing an automatic tape cassette loading device according to the prior art.
Figure 2:
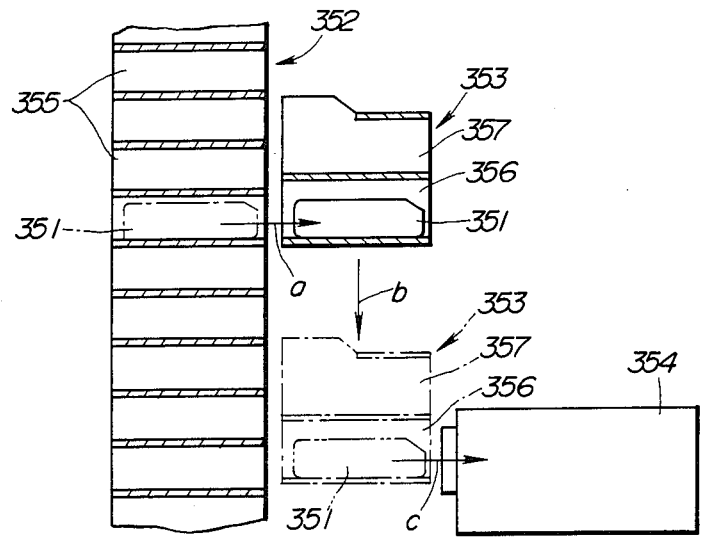
FIGS. 2 and 3 are fragmentary, sectional schematic views respectively illustrating the removal of a tape cassette from a storage compartment and the loading of such cassette into a VTR by the device of FIG. 1, and the unloading of the cassette from the VTR and its return to the original storage compartment.
Figure 3:
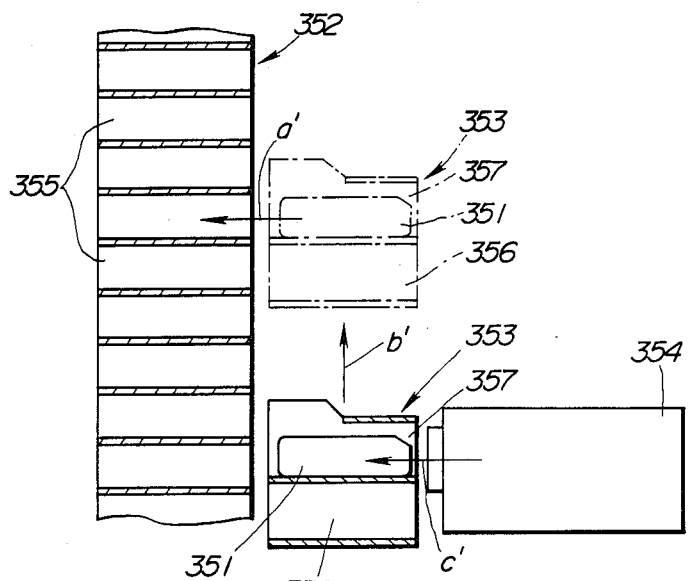
Figure 4:
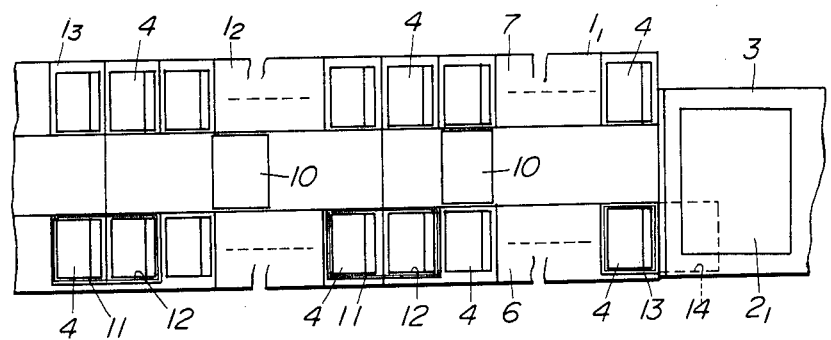
FIG. 4 is a schematic plan view showing the arrangement of an automatic tape cassette selecting and loading device according to an embodiment of the present invention.
Figure 5:
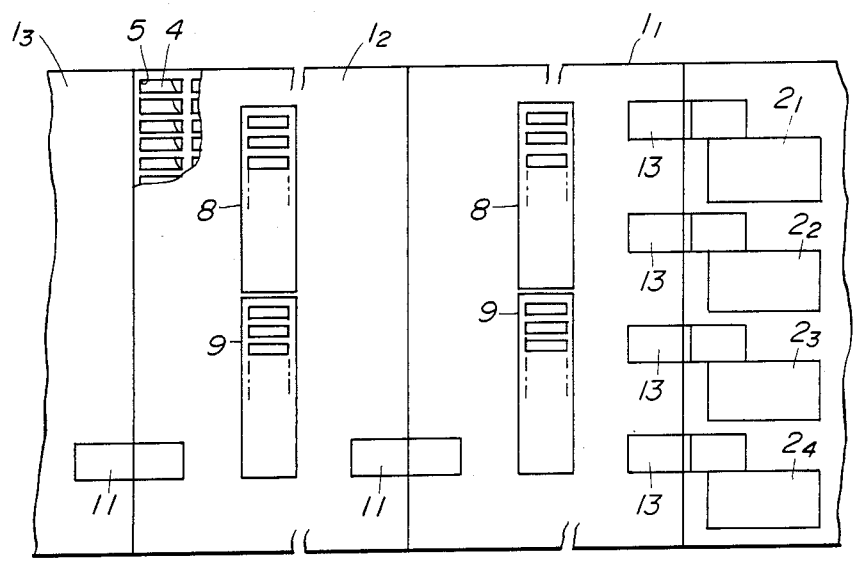
FIG. 5 is a schematic front elevational view of the device of FIG. 4.

As shown in FIGS. 4 and 5, an automatic tape cassette loading device according to an embodiment of the present invention is comprised of a plurality of separate cassette storage shelf blocks $1_1, 1_2, 1_3, \ldots$ placed side-by-side or in tandem, and a VTR housing block 3 for containing a number of, herein four, VTRs $2_1, 2_2, 2_3, 2_4$, capable of operating in at least a reproducing mode and arranged vertically one upon the other.

Each of the cassette storage shelf blocks $1_1, 1_2, 1_3, \ldots$ includes a first cassette storage shelf portion 6 and a second cassette storage shelf portion 7 arranged in facing relation to each other on a foundation or base with a predetermined gap therebetween. Each of the shelf portions 6 and 7 includes a matrix of horizontal rows and vertical columns of cassette storage compartments 5 for storing the tape cassettes 4.

About centrally of the front side of the first cassette storage shelf portion 6 of each of the cassette storage shelf blocks $1_1, 1_2, 1_3$, there are provide an upper vertically elongated cassette reception opening 8 through which the tape cassettes 4 can be manually inserted into compartments 5 aligned therewith, and a lower vertically elongated cassette take-out opening 9 the tape cassettes 4 earlier stored within the cassette storage shelf portions 6,7 and now being out of use can be removed from compartments aligned with opening 9.

The cassette storage shelf blocks $1_1,1_2,1_3,\ldots$ are each provided with a cassette transfer device 10 which is arranged in the gaps or aisle between the respective first and second cassette storage shelf portions 6 and 7. Each transfer device 10 is adapted to introduce and take out tape cassettes into and from the cassette storage compartments 5 of the cassette storage shelf portions 6,7, and also to transfer the thus introduced or taken out tape cassettes 4 vertically or transversely within the respective one of the cassette storage shelf blocks $1_1,1_2,1_3$.

Between each adjacent two of the cassette storage shelf blocks $1_1,1_2,1_3$, for example, between blocks $1_1$ and $1_2$ and between blocks $1_2$ and $1_3$, there is provided a cassette delivery unit 11 constructed as later described and adapted to effect delivery of a tape cassettes transferred by a cassette transfer device 10 within one of the storage shelf blocks $1_1,1_2,1_3,\ldots$ to an adjacent one of the storage shelf blocks $1_1,1_2,1_3,\ldots$. Each such cassette delivery unit 11 is mounted in a storage section 12 formed by cutting away parts of cassette storage compartments 5 of mutually adjoining first storage shelf portions 6 of storage shelf blocks $1_1,1_2,1_3$.

The VTR housing block 3 is placed next to the first cassette storage shelf block $1_1$, that is, at the right-hand end of the series of cassette storage shelf blocks $1_1,1_2,1_3$ arranged side-by-side in FIG. 4. This VTR housing block 3 is also constructed as a block separate from the cassette storage shelf blocks $1_1,1_2,1_3,\ldots$. The VTR housing block 3 and the first cassette storage shelf block $1_1$ adjacent thereto are also provided with cassette delivery units 13 similar to the delivery units 11 described above and each adapted to deliver a tape cassette 4 transferred thereto by the cassette transfer device 10 associated with cassette storage shelf block $1_1$ towards the respective VTR $2_1,2_2,2_3,2_4,\ldots$ in adjacent VTR housing block 3, or to deliver a tape cassette 4 discharged from the respective VTR in housing block 3 towards the first cassette storage shelf block $1_1$. The cassette delivery units 13 are each mounted in a storage section 14 formed in parts of the cassette storage compartments 5 of first shelf portion 6 of shelf block $1_1$ and in parts of the VTR housing block 3 adjacent to the respective VTR. These cassette delivery units 13 are operatively associated with automatic cassette loading and discharging devices situated within VTR housing block 3, as later described, and which are adapted for automatically charging or discharging the tape cassettes 4 between the cassette delivery units 13 and the respective VTRs $2_1,2_2,2_3,2_4,\ldots$.

Cassette Transfer Device 10

The specific structure of each cassette transfer device 10 included in the automatic tape cassette loading device according to this invention will now be explained with reference to FIGS. 6-12.

Figure 6:
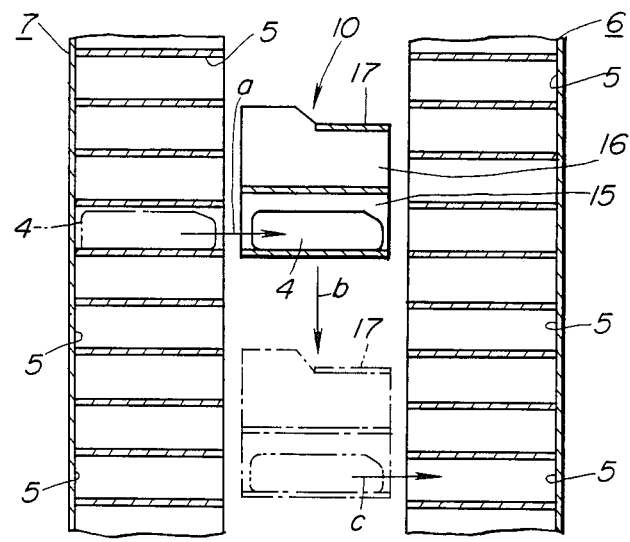
FIGS. 6 and 7 are schematic sectional views to which reference will be made in explaining the operation of a cassette transfer device included in the arrangement of FIGS. 4 and 5.
Figure 7:
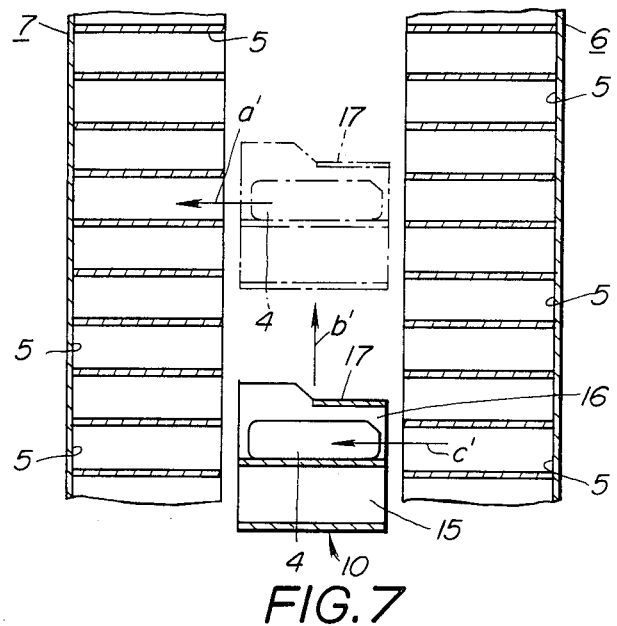

The cassette transfer device 10 is shown to include a cassette transfer member or housing 17 provided with a lower cassette transfer passage 15 and an upper cassette transfer passage 16, and a driving device for effecting vertical and transverse movements of the cassette transfer member 17. The basic operation of the transfer device 10 is as follows: For transferring a tape cassette 4 from a selected cassette storage compartment 5, for example, in shelf portion 7, to a selected compartment 5 in shelf portion 6, the tape cassette 4 from such compartment 5 in shelf portion 7 is introduced in the direction of the arrow a (FIG. 6) into lower cassette transfer passage 15 of cassette transfer member 17. The member 17 is then transferred laterally and vertically to align its passage 15 with the selected compartment 5 in shelf portion 6, and the tape cassette 4 is introduced into the last mentioned compartment 5 out of the transfer passage 15 in the direction of the arrow C (FIG. 6). When returning a tape cassette to its original storage place, the tape cassette 4 is introduced in the direction of arrow c' (FIG. 7) into the upper cassette transfer passage 16 of transfer member 17 from the compartment in shelf portion 6. The transfer member 17 is then transferred laterally and vertically to the original cassette storage compartment 5 of shelf portion 7 and the tape cassette 4 is then transferred in the direction of the arrow a' (FIG. 7) out of cassette transfer passage 16 so as to be stored in the original cassette storage compartment 5 in shelf portion 7. The cassette transfer device 10 is similarly employed for transferring a cassette 4 between a compartment 5 of a storage shelf portion 6 or 7 and a delivery unit 11 or 13.

Figure 8:
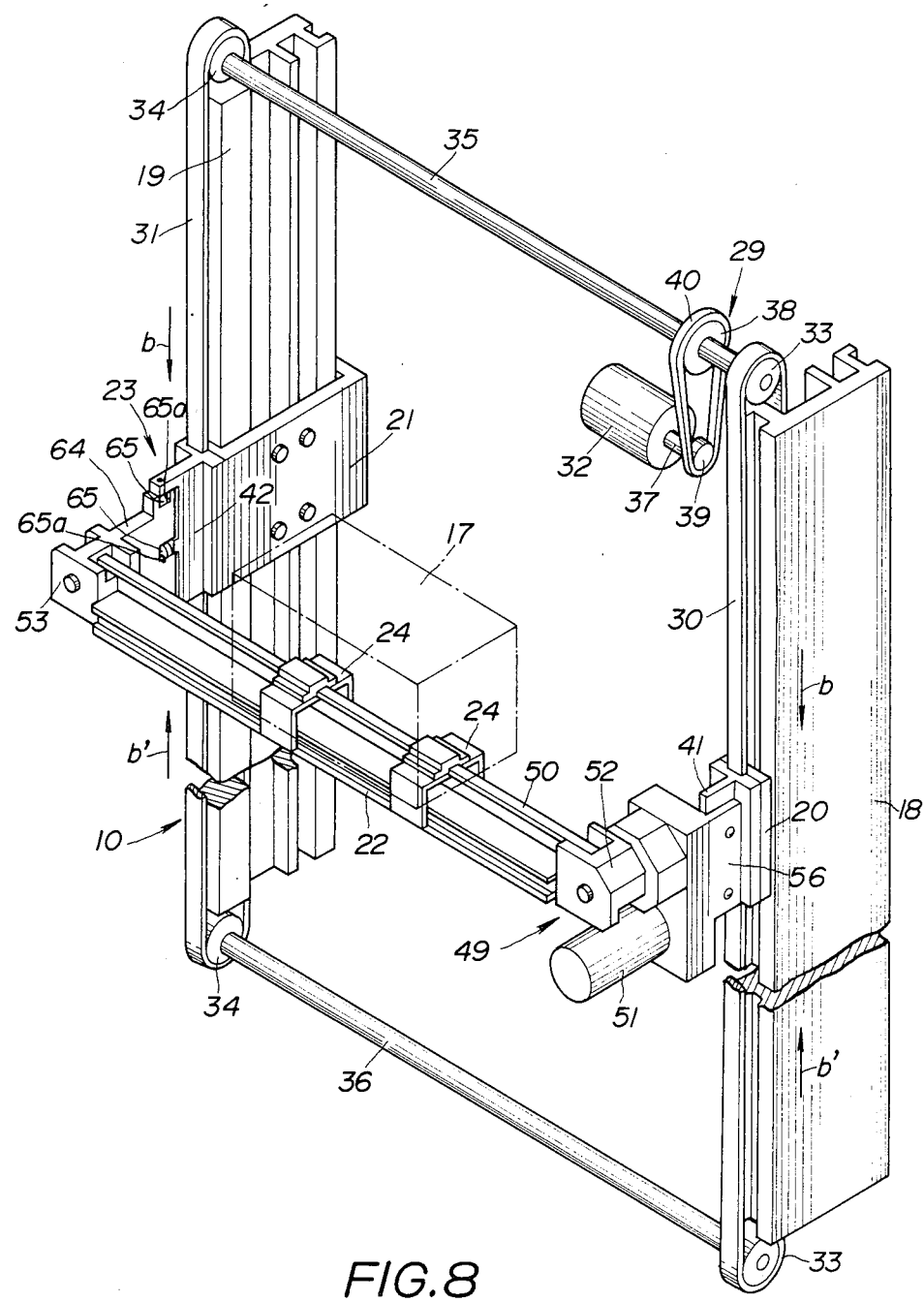
FIG. 8 is a perspective view of a drive mechanism for the cassette transfer device of FIGS. 6 and 7.

The transfer driving device for moving the transfer member 17 in both the vertical and transverse or lateral directions will now be explained in detail. As shown in FIG. 8, the driving device includes a pair of transversely spaced apart vertical guide rails 18 and 19 on which a pair of vertically slidable slide units 20 and 21 respectively, are mounted. A horizontal guide rail 22 extends between vertical guide rails 18 and 19 and has one end fixedly connected to slide unit 20 while its other end is connected to slide unit 21 by a universal joint 23 which is hereinafter described in detail. The cassette transfer member 17 is mounted on top of a pair of sliding elements 24 which are slidable transversely on horizontal guide rail 22.

Figure 9:
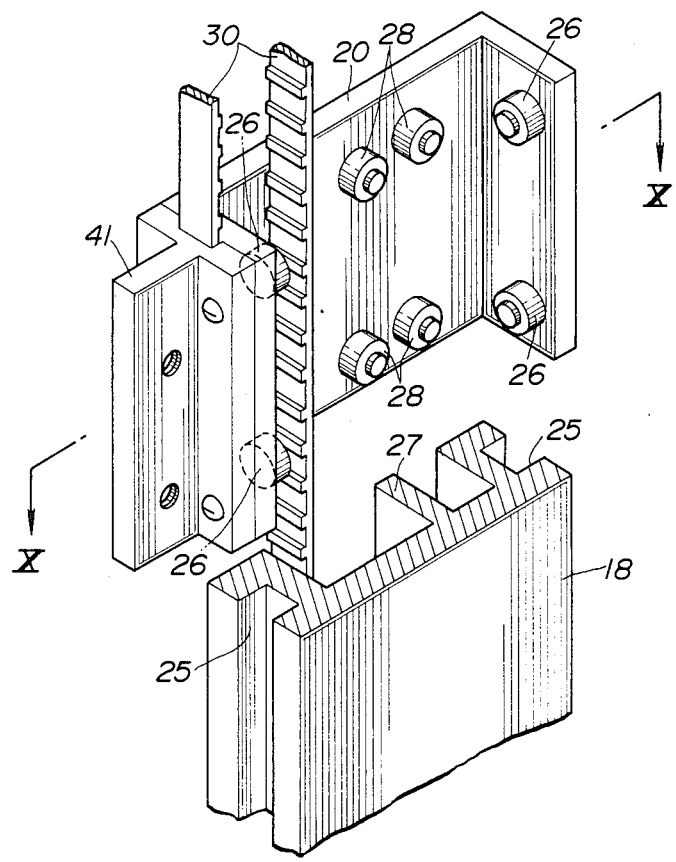
FIG. 9 is a detailed perspective view, which is partly broken away and in section, for showing a portion of the drive mechanism of FIG. 8.
Figure 10:
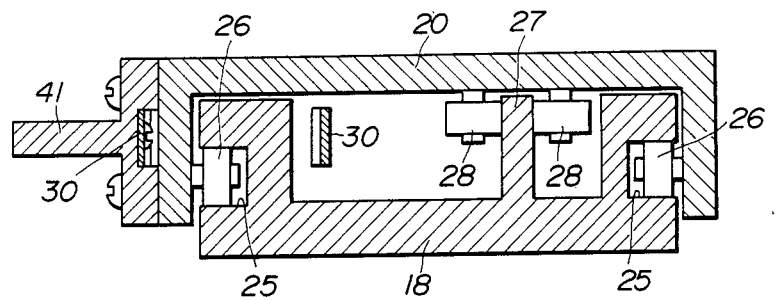
FIG. 10 is a sectional view taken along the line X—X on FIG. 9.

Guide rails 18 and 19 and sliding units 20 and 21 are constructed as substantially identical mirror images of each other. As shown in FIGS. 9 and 10 in respect to rail 18 and sliding unit 20, upper and lower paired guide rolls 26 are mounted for rotation at the forward and rear ends of sliding unit 20 and are engaged within vertically extending guide grooves 25 formed along the front and rear end faces of vertically extending guide rail 18. Front and rear lateral faces of a vertically extending guide rib 27 directed laterally inward along the inner surface of vertically extending guide rail 18 are sandwiched between upper and lower paired guide rolls 28 rotatably mounted on sliding unit 20. Thus, the sliding units 20 and 21 are smoothly slidable along guide grooves 25 and vertical guide ribs 27 of rails 18 and 19.

The sliding units 20 and 21 are moved vertically in synchronism with each other along vertically extending guide rails 18 and 19 by a vertical driving unit 29 which, as shown in FIG. 8, includes left and right paired timing belts 30 and 31 extending vertically along guide rails 18 and 19, and a driving motor 32 for driving the timing belts. These timing belts 30 and 31 extend between upper and lower paired pulleys 33 and 34, respectively, which are secured on upper and lower shafts 35 and 36 rotatably mounted at the upper and lower ends of guide rails 18 and 19. A further timing belt 40 runs about pulleys 38 and 39 respectively secured to upper rotary shaft 35 and to an output shaft 37 of driving motor 32. Timing belts 30 and 31 are secured to the front end faces of sliding units 20 and 21, respectively, by rail holders 41 and 42.

By forward and reverse operation of driving motor 32, timing belts 30 and 31 are driven simultaneously in the vertical directions as indicated by arrows b,b' in FIG. 8 so that guide rail 22 is made to undergo a vertical translatory movement through sliding elements 20 and 21 to cause corresponding vertical movement of cassette transfer member 17.

Figure 12:
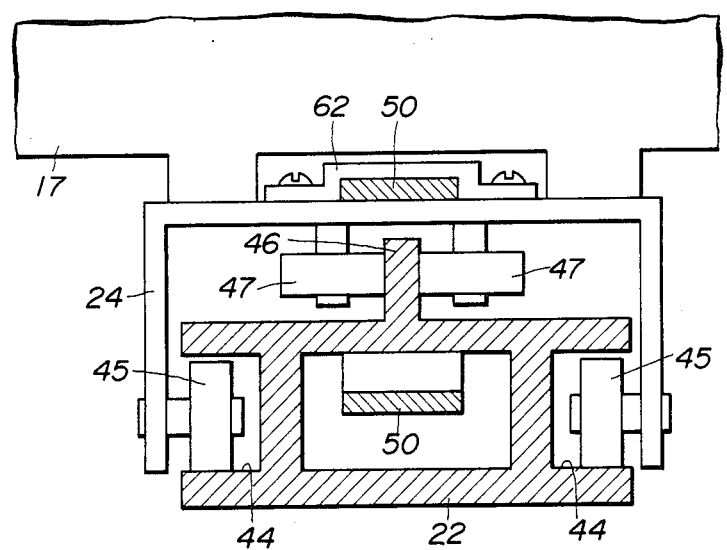
FIG. 12 is a sectional view taken along the line XII—XII on FIG. 11.
Figure 11:
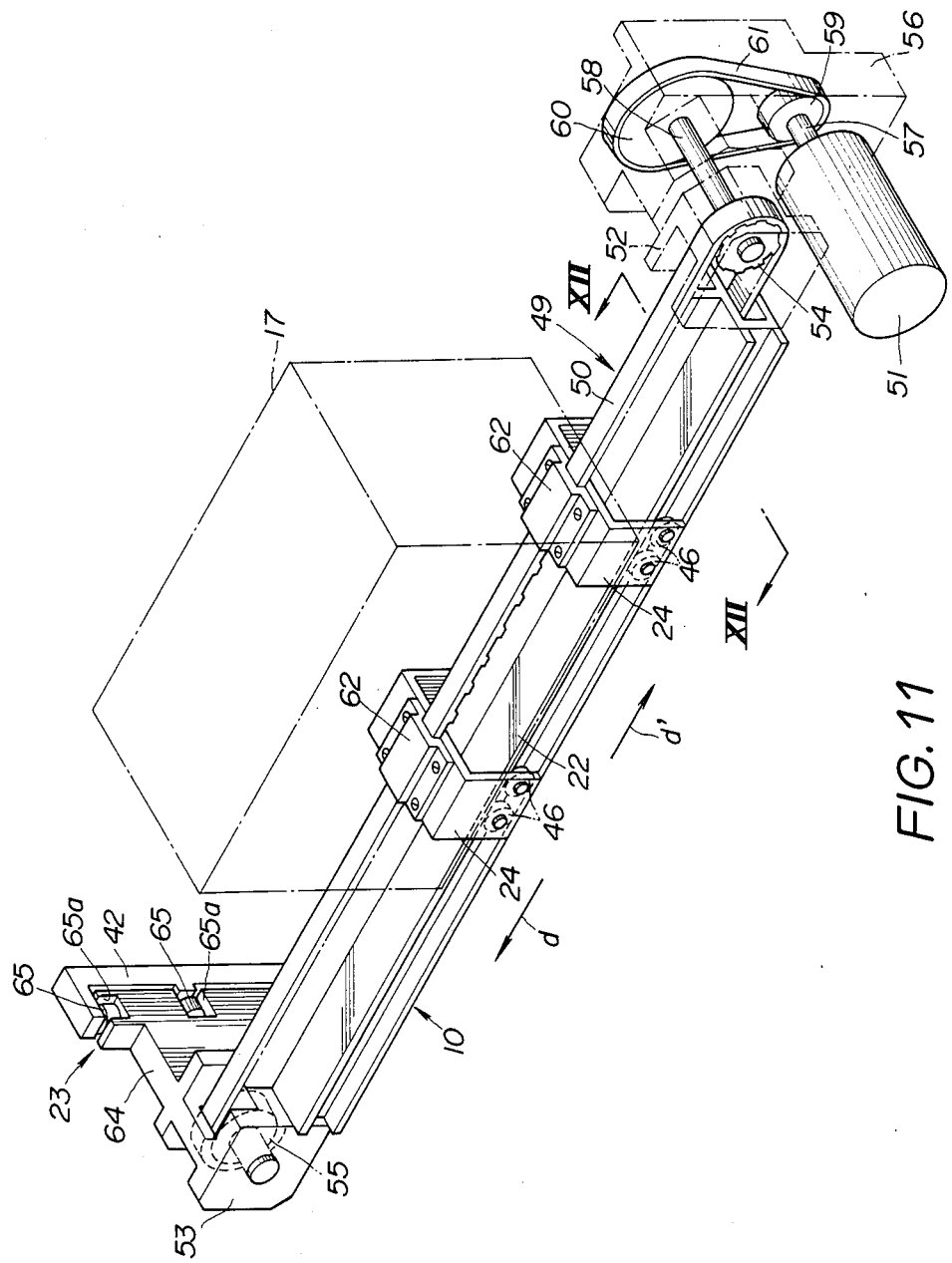
FIG. 11 is a perspective view showing details of a horizontal drive assembly included in the drive mechanism of FIG. 8.

The front and rear longitudinal faces of horizontally extending guide rail 22 are formed with paired horizontally extending guide grooves 44 in which are engaged forward and rear paired guide rolls 45 rotatably mounted at the forward and rear ends of the sliding elements 24, as shown in FIGS. 11 and 12. The front and rear lateral faces of a guide rib 46 directed upwardly along horizontally extending guide rail 22 are sandwiched between forward and rear paired guide rolls 47 rotatably mounted on sliding elements 24 (FIG. 12). Thus, sliding elements 24 are guided by rib 46 and rolls 47 so as to be slidable smoothly along horizontally extending guide rail 22.

The sliding elements 24 are moved transversely along horizontally extending guide rail 22 by a horizontal driving unit 49 which, as shown in FIG. 11, includes a timing belt 50 extending horizontally along guide rail 22 and a driving electric motor 51. Timing belt 50 extends around left and right paired pulleys 54 and 55 rotatably disposed in pulley housings 52 and 53 secured to the opposite ends, respectively, of horizontally extending guide rail 22. Driving motor 51 is mounted on a belt housing 56 secured to pulley housing 52. The timing belt 50 is secured by belt retainers 62 to the upper surfaces of sliding elements 24. A timing belt 61 runs around a pair of pulleys 59 and 60 respectively secured to a motor shaft 57 of driving electric motor 51 and to a rotary shaft 58 connected with pulley 54.

Hence, by forward and reverse operation of driving motor 51, timing belt 50 is driven through timing belt 61 and shaft 58 to move in the transverse directions indicated by the arrows d and d' in FIG. 11 without slipping so that cassette transfer member 17 is similarly moved transversely along guide rail 22 by sliding elements 24.

It will be noted that motor shaft 37 of driving motor 32, rotary shaft 35, motor shaft 57 of driving motor 51 and rotary shaft 58 are provided with respective position encoding devices for effecting address allocation, in the vertical and transverse, directions of cassette transfer member 17 in respect to cassette storage compartments 5 of cassette storage portions 6 and 7 and in respect to cassette delivery units 11 and 13.

As noted earlier, a universal joint 23 is provided between sliding unit 21 and the adjacent end of guide rail 22. Such universal joint 23 is constituted by a rail holder 64 secured to pulley housing 53 and a roll holder 42 on sliding unit 21 (FIG. 11). Three rolls 65 are mounted for rotation on roll holder 42 and engage in three respective grooves 65a provided in rail holder 64.

By connecting horizontal guide rail 22 to sliding unit 21 by means of universal joint 23, any change in the distance between sliding units 20 and 21, caused by deviation from exact parallelism of guide rails 18 and 19, experienced during the movement of horizontally extending guide rail 22 along guide rails 18 and 19 in the vertical direction may be accommodated by the freedom of movement in the transverse and rotational directions afforded by universal joint 23. In this manner, any distortion of sliding units 20 and 21 relative to the guide rails 18 and 19, caused by deviations from parallelism, with resultant binding or large sliding resistance may be prevented so that sliding units 20 and 21 can slide smoothly and noiselessly along vertically extending guide rails 18 and 19.

Cassette Push-Out Unit

Each cassette storage compartment 5 of the first and second cassette storage shelf portions 6 and 7 is provided with a cassette push-out unit 66 which will be described in detail with reference to FIGS. 13-17.

Each cassette storage compartment 5 is in the form of a parallelepipedic space defined by horizontally extending vertically spaced shelf plates 67 and vertically extending left and right side plates 68 and 69. Each cassette storage compartment 5 has an opening 70 for insertion and removal of a tape cassette and which faces toward the aisle or gap between shelf portions 6 and 7, that is, toward cassette transfer member 17.

Figure 13:
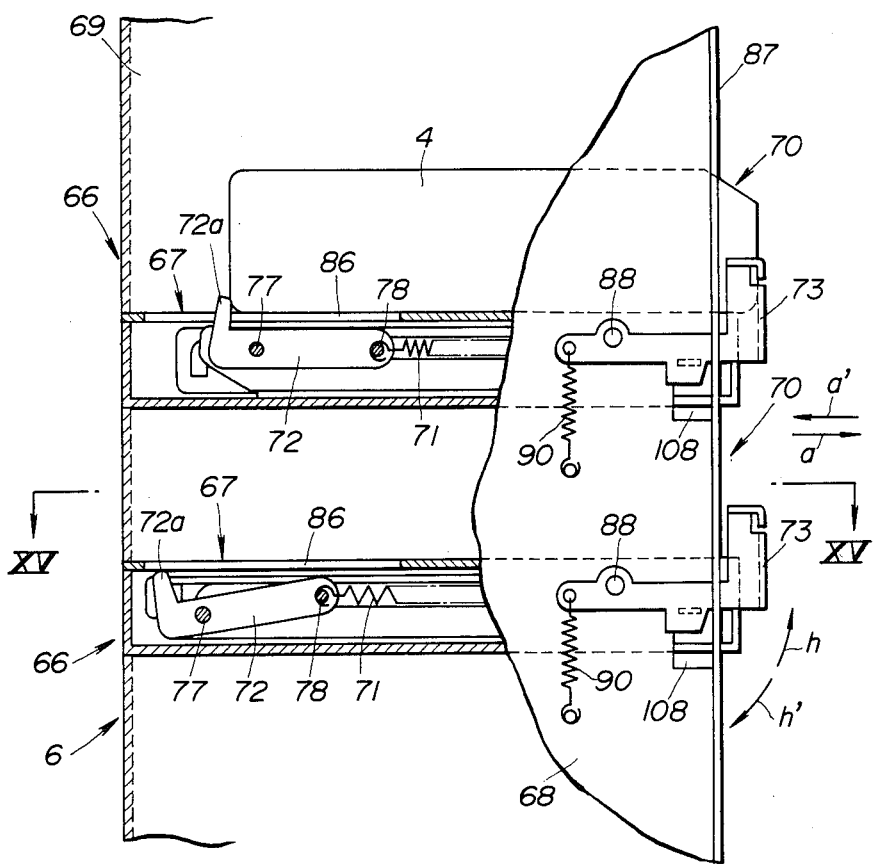
FIG. 13 is a side elevational view, partly broken away and in section, and showing details of cassette storage compartments and respective cassette push-out devices included in the device according to this invention.
Figure 14:
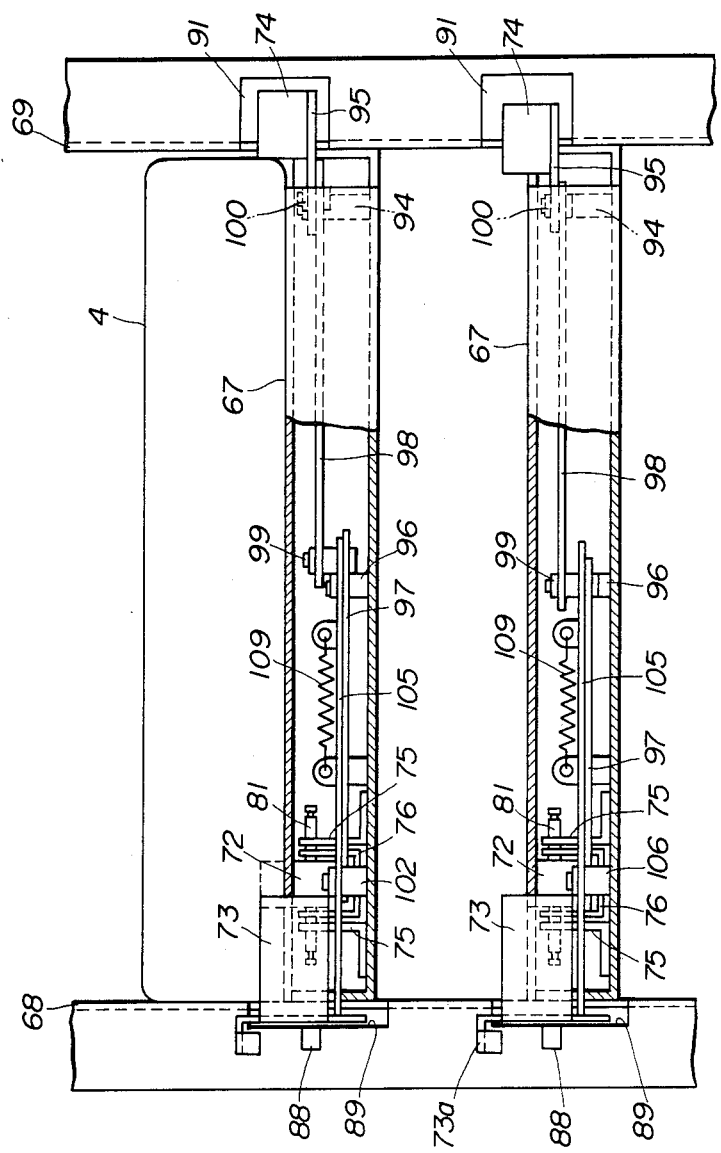
FIG. 14 is a front elevational view of the structure shown on FIG. 13.

The cassette push-out unit 66 is comprised of a push-out member 72 biased by a pair of springs 71 in the direction of the arrow a in FIG. 13 from a retracted or inoperative position within the respective compartment 5 towards an extended or operative position in the vicinity of the cassette insertion and removal opening 70, a stopper 73 provided adjacent the cassette insertion and removal opening 70, and a detection member 74 also adjacent opening 70 of the cassette storage compartment 5 (FIG. 14).

Figure 15:
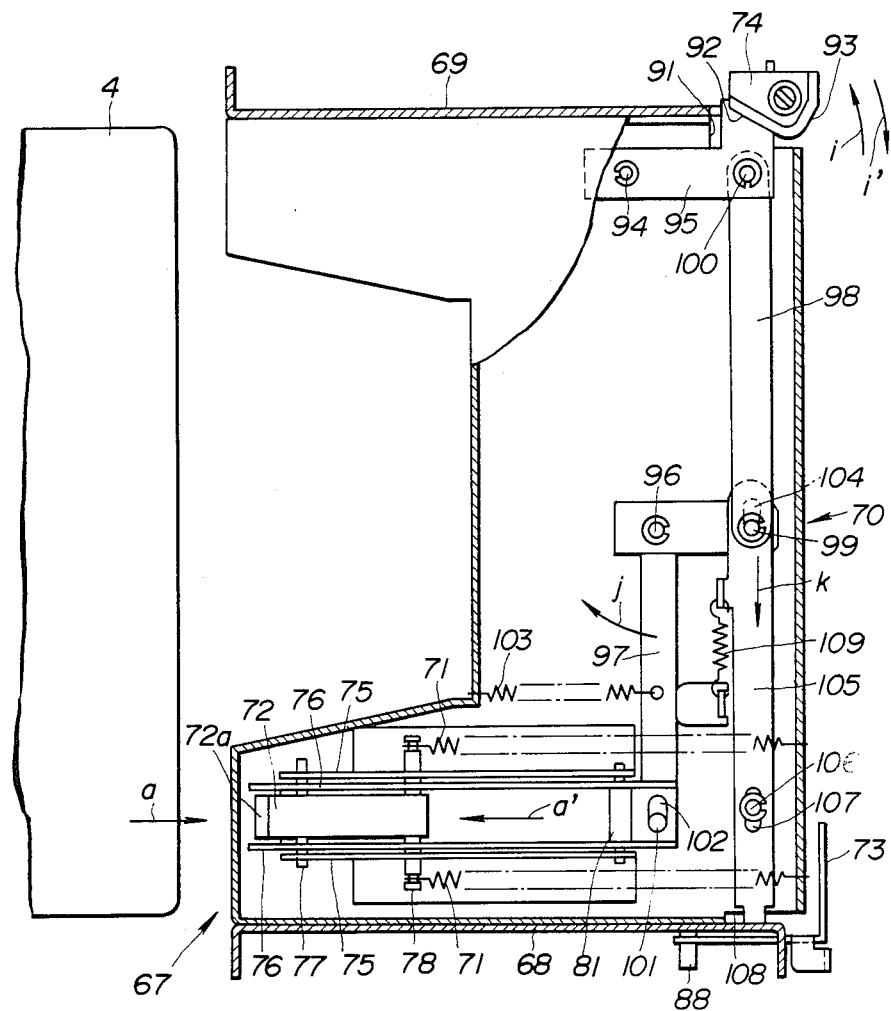
FIG. 15 is a plan view of one of the storage compartments and the associated mechanisms as viewed in the direction of the arrows XV—XV on FIG. 13.
Figure 16:
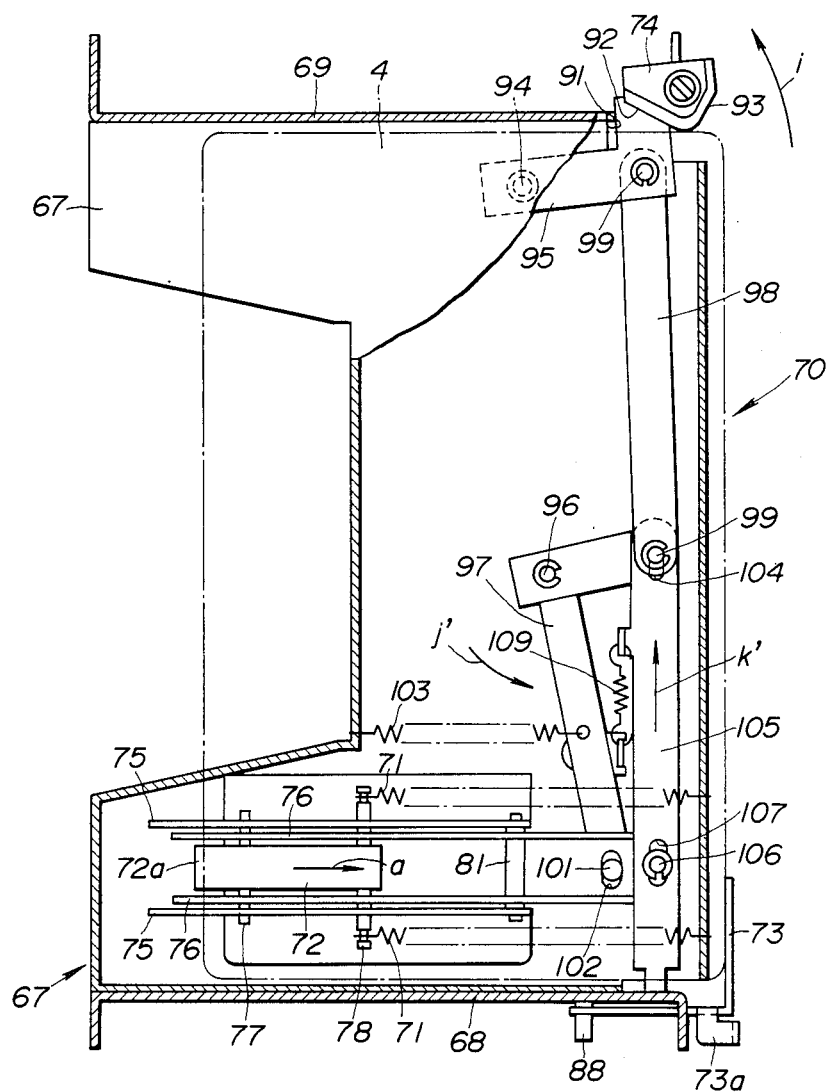
FIG. 16 is a view similar to that of FIG. 15, but showing the compartment and associated mechanisms in the condition thereof when a cassette is stored in the compartment.
Figure 17:
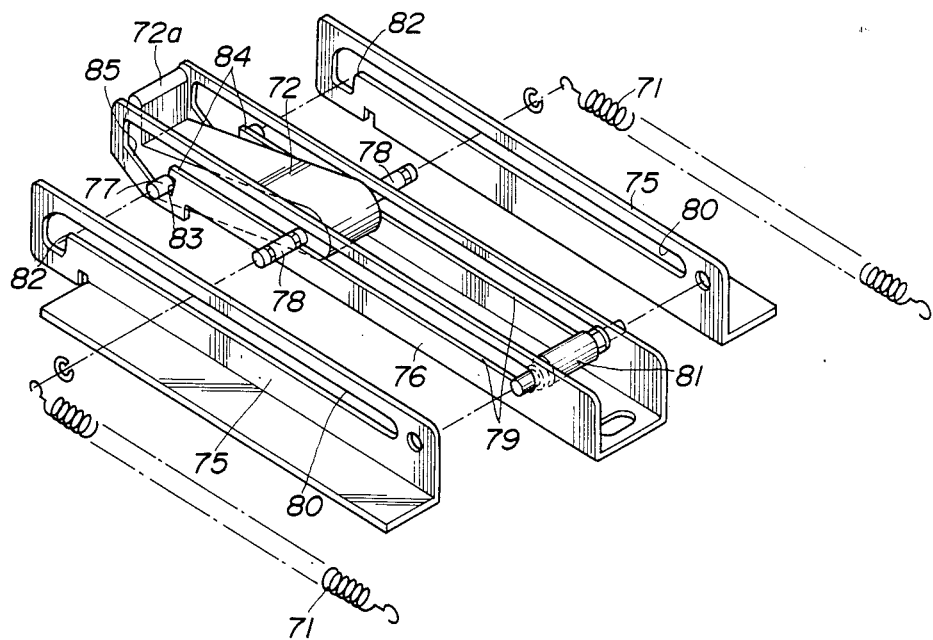
FIG. 17 is an exploded perspective view of elements included in a push-out device associated with each of the storage compartments.

On shelf plate 67 at the bottom of compartment 5, a pair of slide guide plates 75 are secured parallel to each other along the left and right sides of the trajectory of the reciprocating movement of push-out member 72, as shown in FIGS. 14-17. The push-out member 72 is slidably mounted within a slide plate 76 of channel-shaped cross-section which is slidably disposed between slide guide plates 75. The push-out member 72 is L-shaped and elongated in its reciprocating direction so as to define an up-turned hook 72a at its end directed into the respective compartment 5. The push-out member 72 has a pair of slide pins 77 and 78 extending horizontally from its opposite sides at the opposite end portions of member 72. The ends of pins 77 and 78 slidably engage in left and right side pairs of guide slots 79 and 80 respectively formed in slide plate 76 and in slide plates 75 so that push-out member 72 is slidable along these guide slots 79 and 80 (FIG. 17).

A guide pin 81 is installed ahead of push-out member 72 between the forward end parts of slide guide plates 75 and is slidably engaged in both guide slots 79 of slide plate 76. The push-out member 72 is biased forwardly or in the direction of arrow a in FIG. 15 by the earlier mentioned paired springs 71 which, at one end, are connected to the ends of guide pin 78. The other or forward ends of springs 71 are suitably anchored to a forward portion of shelf 67. Guide slots 80 of slide guide plates 75 are formed with lock portions 82 extending downwards at right angles at the ends of guide grooves 80 remote from opening 70. The corresponding end parts of guide slots 79 of slide plate 76 are similarly formed with downwardly directed locking portions 83. Each locking portion 83 has an undercut defined by a small projection 84, and the lower edge 85 of each locking portion 83 is inclined or extends obliquely upward towards the interior of the respective cassette storage compartment 5. The hook 72a of push-out member 72 can project through an elongated opening 86

(FIG. 13) in shelf plate 67 so as to project above the latter.

Stopper 73 is substantially L-shaped, as shown in FIGS. 13–16, and is pivotally mounted on side plate 68 for turning about a pin 88, as indicated by arrows h,h' in FIG. 13. It will be noted that stopper 73 is adapted for turning in a vertical plane within a slit 89 formed in a flange 87 extending along the edge of side plate 68 bordering opening 70. Stopper 73 is biased by a spring 90 so as to be turned in the direction of arrow h in FIG. 13.

Detection member 74 is disposed within a cut-out 92 (FIG. 14) formed in the other side plate 69 adjacent opening 70, and member 74 is formed with front and rear inclined edges 92 and 93 (FIG. 15). Detection member 74 is mounted at one end of an L-shaped link 95 which is pivotally mounted at its other end on a pin 94 carried by shelf plate 67 so that detection member 74 may be pivoted in the transverse direction, as indicated by arrows i,i' in FIG. 15. The opposite ends of a link 98 are respectively connected by pins 99 and 100 to L-shaped link 95 and to one end of a pivotally mounted L-shaped lever 97. The other end of L-shaped lever 97 is connected to slide plate 76 by a pin 101 engaging in a laterally elongated opening 102 in slide plate 76. L-shaped lever 97 is urged by a spring 103 in the direction indicated by an arrow j in FIG. 15 so that slide plate 76 is thereby biased in the direction indicated by arrow a' and detection member 74 is also biased into the cassette storage section 5, that is, in the direction indicated by arrow i' in FIG. 15. A stopper locking plate 105 has an elongated opening 104 at one end receiving pin 99 of L-shaped lever 97, and further has an elongated opening 107 receiving a guide pin 106 provided on shelf plate 67. The end part of stopper locking plate 105 remote from pin 99 may be projected above the stopper 73 through a cut-out 108 provided in side plate 68. Stopper locking plate 105 is biased by a spring 109 in the direction indicated by an arrow k in FIG. 15.

Insertion and Removal of Tape Cassettes Into and Out of Compartments 5

The insertion and removal of tape cassettes 4 into and out of tape storage compartments 5 provided with push-out units 66 will now be described with reference to FIGS. 13–19.

A new tape cassette is inserted initially into one of the cassette storage compartments 5 communicating with the cassette reception opening 8 formed by partially cutting away the front side of the respective cassette storage compartments 5 provided in first cassette storage shelf portion 6. The tape cassette 4 manually inserted into a cassette storage compartment 5 communicating with cassette reception opening 8 may then be transferred to, and stored in a predetermined one of the cassette storage compartments 5 of the first and second cassette storage shelf portions 6,7 by the operation of the respective cassette transfer device 10.

In removing a tape cassette 4 which has come out of use, that cassette 4 is first transferred by the respective cassette transfer device 10 to a cassette storage compartment 5 of shelf portion 6 communicating with cassette take-out opening 9, and then the cassette is manually removed from such compartment 5 through opening 9.

The above generally mentioned operations of inserting and removing tape cassettes 4 into and out of compartments 5 communicating with reception opening 8 and take-out opening 9, respectively, will now be described in greater detail.

Figure 18A:
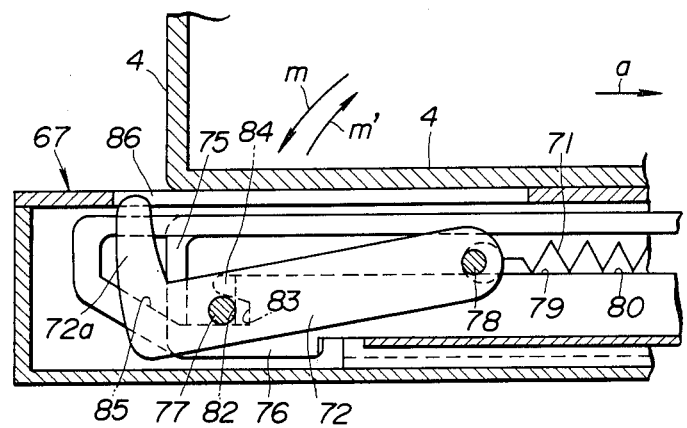

Before initiating the insertion of a tape cassette 4 into a compartment 5 communicating with opening 8, the push-out member 72 of the respective cassette push-out unit 66 is locked in the retracted position shown in FIG. 18A to which it has been shifted against the force of springs 71. In such retracted position, push-out member 72 has been rocked in the direction of arrow m, about slide pin 78, and the other slide pin 77 is held under small projection 84 within locking portions 82 and 83 of guide slots 79 and 80. Thus, hook 72a of push-out member 72 is disposed below the lower surface of compartment 5, as shown in FIG. 18A. The stopper 73 biased by spring 90 in the direction of the arrow h in FIG. 13 is thereby protruded into cassette insertion and removal opening 70, as shown in FIG. 14. The detection member 74 biased by spring 103 in the direction of arrow i' in FIG. 15 is thereby intruded into cassette storage compartment 5. At this time, the leading end of stopper locking plate 105 biased by spring 109 in the direction of arrow k in FIG. 15 abuts against the lateral side of stopper 73. However, since pin 99 of L-shaped lever 97 is engaged within elongated opening 104 of stopper locking plate 105, L-shaped lever 97 can be turned by spring 103 in the direction of arrow j without limitation by stopper locking plate 105 so that detection member 74 can be intruded into cassette storage compartment 5 as shown in FIG. 15.

Then, as shown in FIG. 15, tape cassette 4 is introduced horizontally into compartment 5 through the cassette reception opening 8 in the direction of arrow a without any interference from hook 72a of push-out member 72.

Figure 18B:
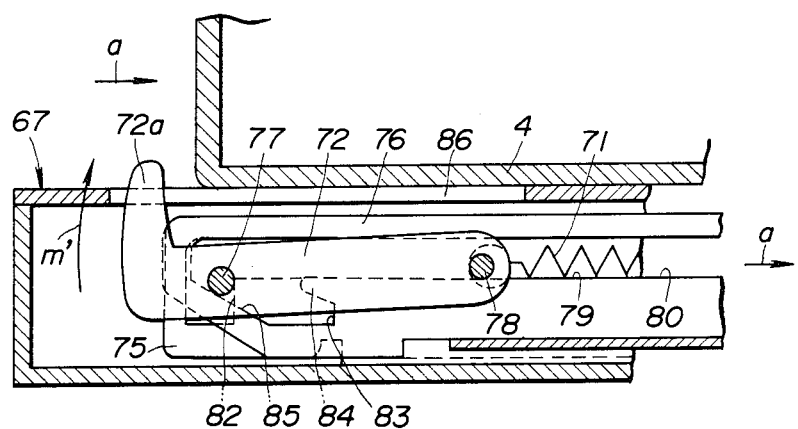

As the leading portion of the tape cassette thus introduced into a cassette storage compartment 5 in the direction of the arrow a in FIG. 15 approaches stopper 73, the trailing part of tape cassette 4 will pass over the hooked part 72a of push-out member 72, as shown in FIG. 18A. At such time, a corner of the leading portion of tape cassette 4 rides against inclined surface 92 of detection member 74 for propelling the latter laterally outward from cassette storage compartment 5. This causes L-shaped link 95 to be turned in the direction of arrow i on FIG. 15 so that link 98 turns lever 97 against the force of the spring 103 to move slide plate 76 in the direction of arrow a. When slide plate 76 is moved in the direction of the arrow a on FIG. 18A, the small projection 84 over the undercut of locking portion 83 is disengaged from over slide pin 77 to thereby release its locking action on push-out member 72. Then, as shown in FIG. 18B, the inclined edge 85 of locking portion 83 of slide plate 76 is thrust against slide pin 77 in the direction of arrow a so that pin 77 is displaced upwards in the direction of the arrow m' on FIG. 18B. As a result, push-out member 72 is turned in the direction of arrow m' about slide pin 78 so that its hook 72a is made to protrude above the surface of shelf plate 67 through elongated opening 86. When hook 72a is fully projected above shelf plate 67, slide pin 77 is released from locking portions 82 and 83 of guide slots 79 and 80, as shown in FIG. 18C.

Figure 18C:
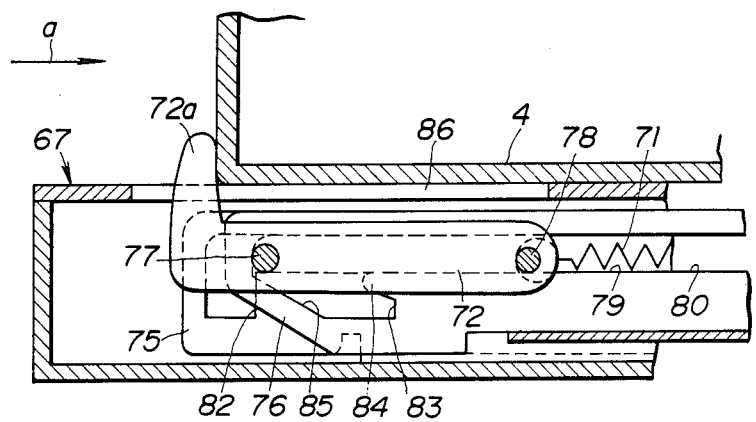
Figure 18D:
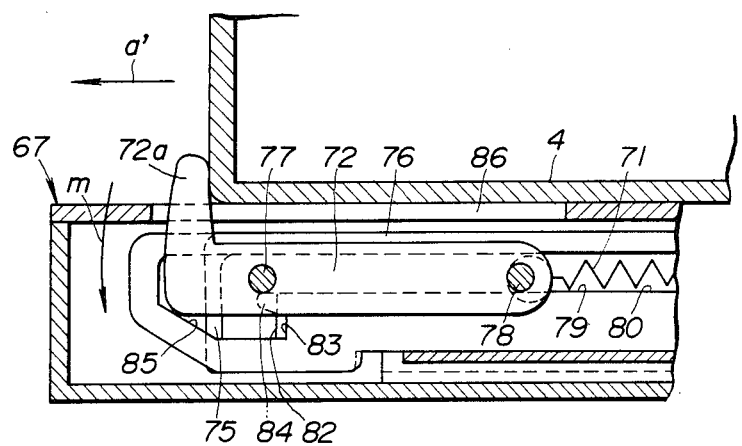

At that instant, push-out member 72 is urged by springs 71 from the retracted position of FIG. 15 towards the opening 70, with the hook 72a of push-out member 72 engaging and thrusting the tape cassette 4 in the direction of the arrow a, as shown in FIG. 18C. As a result, tape cassette 4 is automatically moved by push-out member 72 in the direction of the arrow a until it comes to a standstill with a corner of the leading part of the cassette in abutment with stopper 73, as shown in FIG. 16. The tape cassette 4 then continues to be maintained in this state. When push-out member 72 is thus moved in the direction of arrow a, slide pins 77,78 are moved within guide slots 79,80 so that push-out member 72 is moved horizontally.

When a tape cassette 4 is to be removed or extracted from a cassette storage compartment 5 through the cassette removal or take-out opening 9, the tape cassette 4 is grasped manually at its rear part and pulled in the direction of the arrow a'. At such time, push-out member 72 is pushed back from the extended position shown in FIG. 16 toward the retracted position shown in FIG. 15 against the force of springs 71 in a reversal of the operation described above for cassette insertion. More specifically, as the corner of tape cassette 4 is disengaged from detection member 74 in the course of cassette movement in the direction of the arrow a', on FIG. 15, detection member 74 is free to be moved by the force of spring 103 in the direction of arrow i' through the L-shaped lever 97, link member 98 and L-shaped link member 95. The slide plate 76 is also displaced by the force of spring 103 in the direction of the arrow a'. After having been thrust to its retracted position in the direction of the arrow a' in FIG. 18D, the push-out member 72 is turned in the direction of the arrow m about slide pin 78 and then locked with the other slide pin 77 moved out of guide slots 79 and 80 into locking portions 82 and 83 and being held therein by projection 84. Thus, hook 72a of push-out member 72 is depressed through elongated opening 86 into the interior of shelf plate 67 so as to be disposed below the bottom surface or floor of cassette storage compartment 5, as shown on FIG. 18E. Finally, the manual withdrawal of cassette 4 from compartment 5 is completed, as shown on FIG. 19.

Actuating Mechanism for Cassette Push-Out Units 66 and Cassette Feed Mechanisms for the Transfer Device 10

An actuating mechanism 110 for the cassette push-out units 66 and cassette feed mechanisms 111 and 112 for the upper and lower cassette transfer passages 15 and 16 will now be described with reference to FIGS. 20–25.

Figure 20:
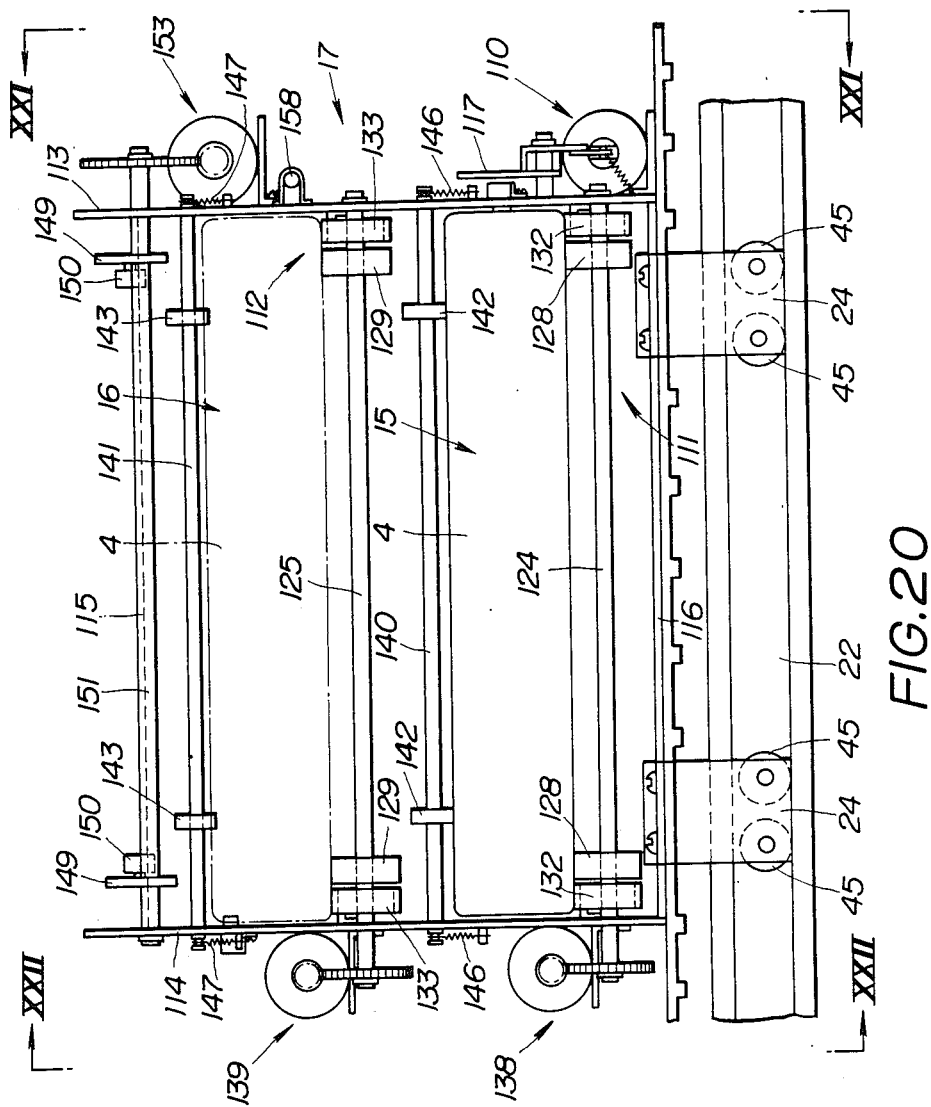
FIG. 20 is a front elevational view of a cassette transfer device associated with each cassette storage shelf block in the automatic tape cassette selecting and loading device according to this invention.
Figure 21:
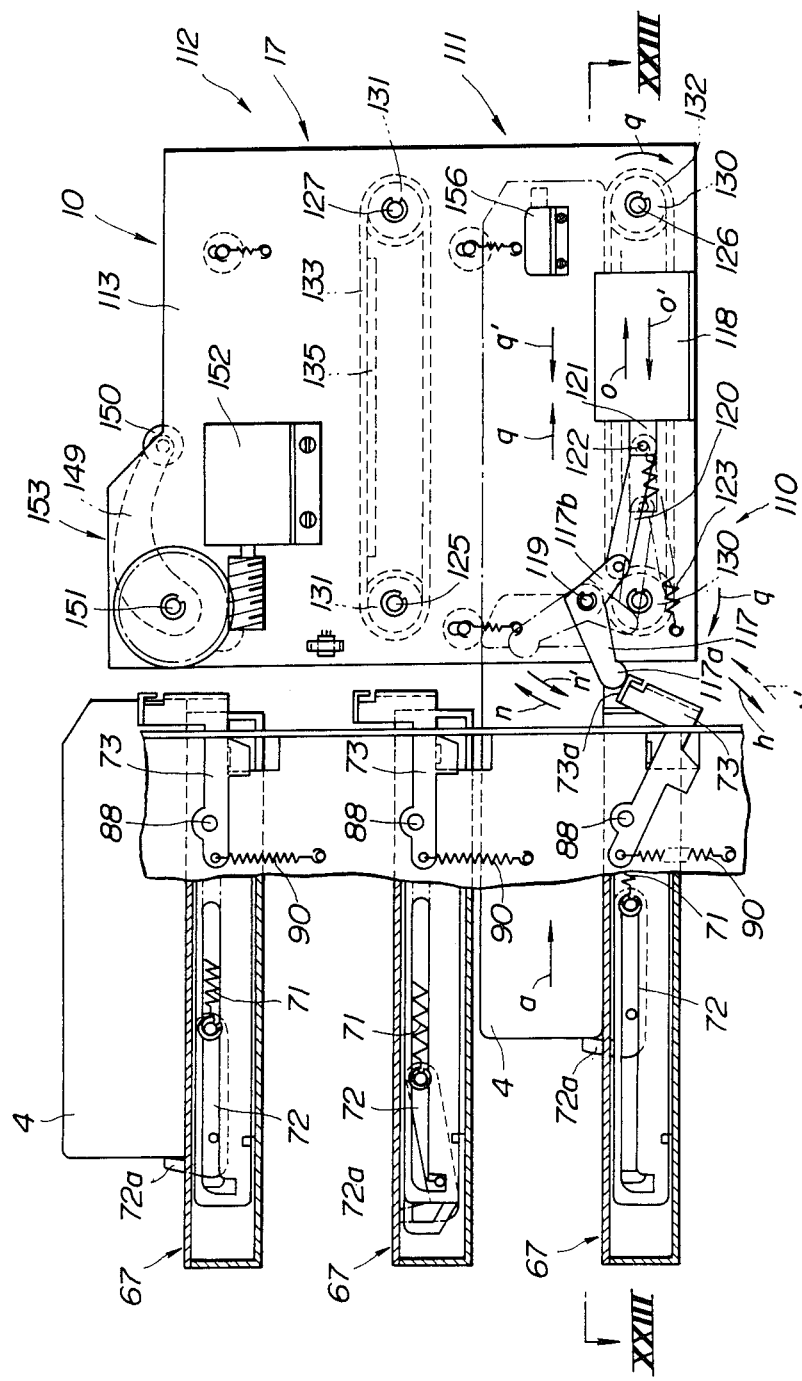
FIG. 21 is a side elevational view of the cassette transfer device as viewed in the direction of the arrows XXI—XXI on FIG. XX.
Figure 22:
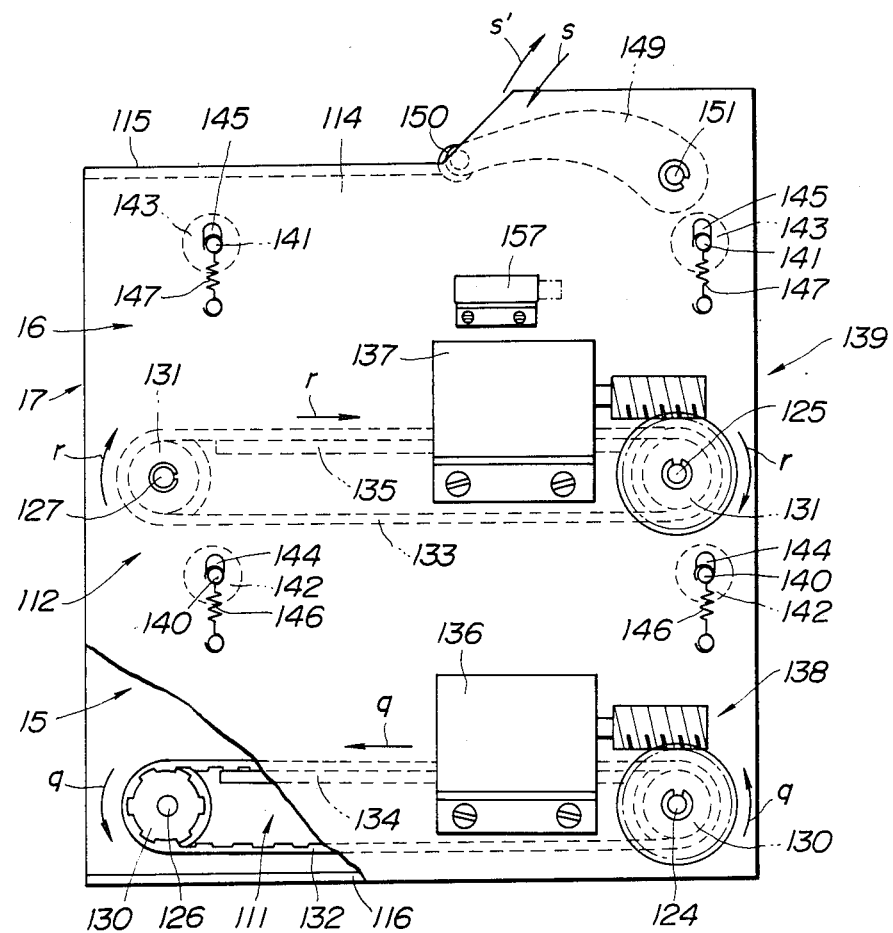
FIG. 22 is a side elevational view as viewed in the direction of the arrows XXII—XXII on FIG. 20.

First of all, as shown in FIGS. 20–22, cassette transfer member 17 is in the form of a housing having left and right side plates 113 and 114, a ceiling plate 115 and a bottom plate 116. The opposite ends of upper and lower cassette transfer passages 15 and 16 are open.

As also shown in FIGS. 20–22, actuating mechanism 110 is attached to the outer surface of side plate 113 at the lower portion of the latter. In the drawings, only the actuating mechanism 110 at the side of transfer member 17 facing second cassette storage shelf portion 7 is shown, but it is to be understood that a similar actuating mechanism 110 is provided at the side of transfer member 17 facing first cassette storage shelf 6 and is omitted only for the sake of clarity. The illustrated actuating mechanism 110 includes an actuating lever 117 for displacing stopper 73 to an inoperative position and a driving solenoid 118. The actuating lever 117 is L-shaped and pivotally mounted on side plate 113 by means of a pin 119 situated between arms 117a and 117b of lever 117. The arm 117a is engageable from above with stopper 73, and the other arm 117b is connected through a link 120 to an armature 121 of solenoid 118 by means of a connecting pin 122. The actuating lever 117 is biased to turn in the direction of the arrow n to the position shown in broken lines on FIG. 21 by a spring 123 connected to pin 122 for extending armature 121 of solenoid 118. On the other hand, when solenoid 118 is energized to retract its armature 121, actuating lever 117 is turned thereby in the direction of arrow n' to the position shown in full lines on FIG. 21.

The cassette feed mechanisms 111 and 112 are identical, and are shown to include, below the front and rear portions of cassette transfer passages 15 and 16, driving shafts 124 and 125 and driven shafts 126 and 127, respectively, which are horizontally journaled between side plates 113 and 114 in parallel with each other (FIG. 22). Feed rolls 128 and 129 are respectively secured on the left and right hand end portions of shafts 124 and 126 and shafts 125 and 127 (FIG. 20). Pulleys 130 and 131 are secured to the left and right end portions of shafts 124 and 126 and of shafts 125 and 127, and timing belts 132 and 133 extend around and between pulleys 130,131, respectively. The upper horizontal runs of timing belts 132 and 133 are guided horizontally on left and right guides 134 and 135, respectively, secured horizontally to the inner surfaces of side plates 113 and 114. Driving shafts 124 and 125 are rotatably driven through speed reducing units 138 and 139 by electric motors 136 and 137 mounted on the outer surface of side plate 114 (FIG. 22).

Idler shafts 140 and 141 are horizontally arranged between side plates 113 and 114, in parallel with each other, above the front and rear portions of cassette transfer passages 15 and 16, respectively. Idler rollers 142 and 143 are rotatably mounted on the opposite end portion of shafts 140 and 141, respectively, which are movably supported in vertically elongated slots 144 and 145 in side plates 113 and 114, and biased downwardly by paired springs 146 and 147.

Figure 24A:
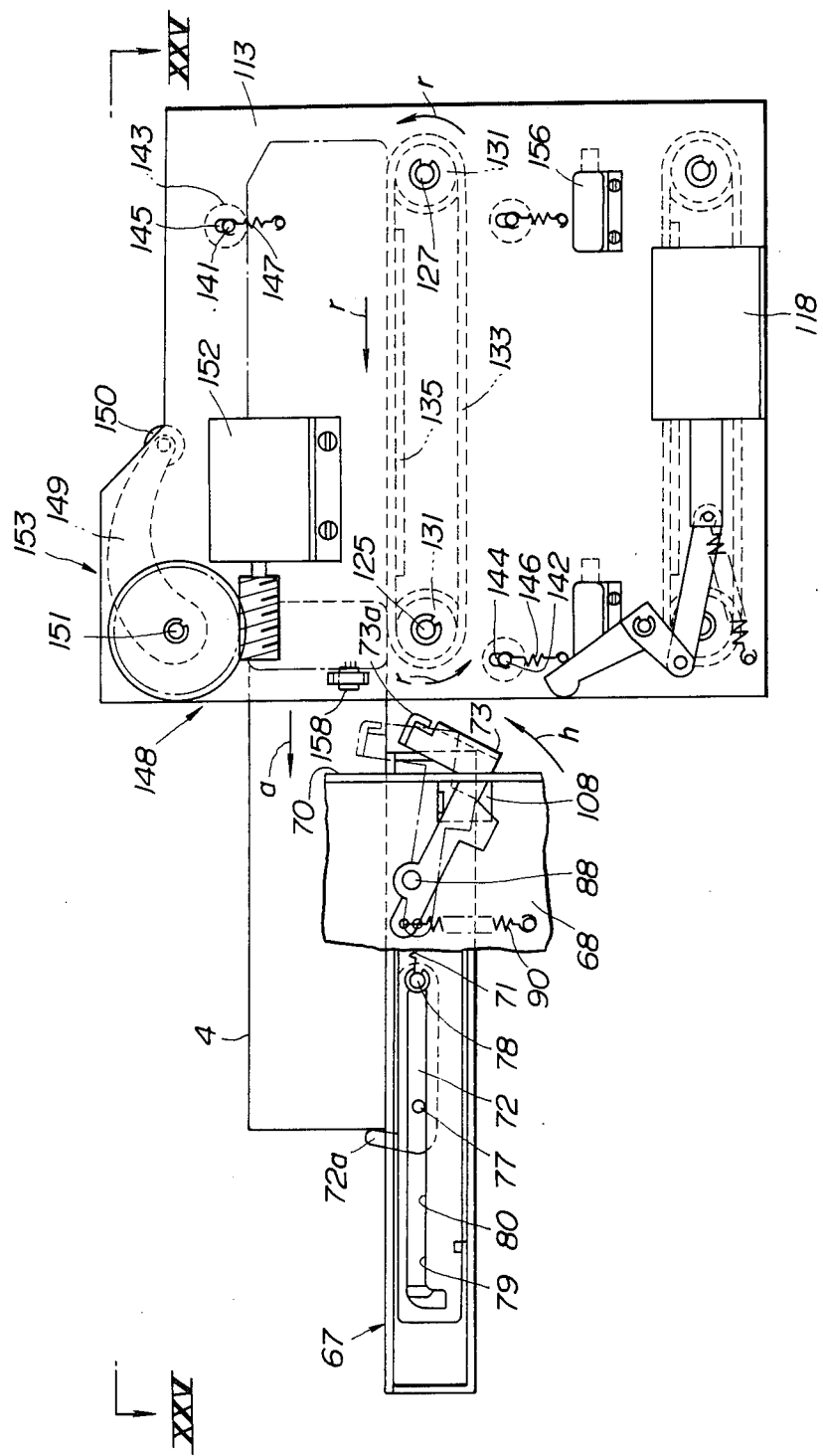
FIGS. 24A and 24B are side views similar to that of FIG. 21, but illustrating the operation of the cassette transfer device in returning a cassette to a cassette storage compartment.

Left and right paired rotary arms 149 are secured, at one end, on end portions of a horizontal rotary shaft 151 which extends between, and has its opposite ends journaled in side plates 113 and 114. Such rotary shaft 151 is arranged above a delivery opening 148 at the end of upper cassette transfer passage 116 facing toward storage shelf portion 7. Rolls 150 are rotatably mounted on the free end portions of arms 149 which are angularly displaced together with shaft 151 in one or the other of the directions indicated by the arrows s and s' on FIG. 24B by a reversible electric motor 152 mounted on the outer surface of side plate 113 and being connected with shaft 151 through a speed reduction unit 153 (FIG. 24A).

The automatic delivery of tape cassettes 4 between cassette storage compartments 5 in cassette storage shelf portion 7 and cassette transfer passages 15 and 16 of cassette transfer device 10 will now be explained.

As shown on FIG. 21, after cassette transfer passage 15 of cassette transfer device 10 has been aligned with the cassette insertion and removal opening 70 of a predetermined cassette storage compartment 5, solenoid 118 is energized to retract its armature 121 in the direction of the arrow o against the force of spring 123 so that actuating lever 117 is turned in the direction of the arrow n' from the position shown in broken lines to the position shown in solid lines. As a result of such movement of actuating lever 117, its arm 117a acts downwardly on projection 73a of stopper 73 so that the latter is turned in the direction of the arrow h' against the force of spring 90, and is thereby moved to an inoperative position below the cassette insertion and removal opening 70 of compartment 5. In other words, stopper 73 is moved out of the path of cassette 4 in the respective compartment 5 so that cassette push-out unit 66, which has been exerting a propulsive force against the tape cassette for holding the latter against stopper 73, as previously explained with reference to FIG. 16, is now free to propel the tape cassette 4 through opening 70 of compartment 5 in the direction of the arrow a on FIGS. 21 and 23. Push-out unit 66 thereby delivers the cassette 4 into cassette transfer passage 15 continues to propel the cassette until slide pin 78, on which push-out member 72 is mounted, abuts against the end of guide slot 80 near to opening 70. At such time, the bottom surface of tape cassette 4 has been transferred onto the upper runs of belts 132 and feed rolls 130 on driving shaft 124 which is already being rotatably driven by operation of motor 136 in the direction for moving the upper runs of belts 132 in the direction of the arrows q on FIGS. 21 and 22.

Figure 23:
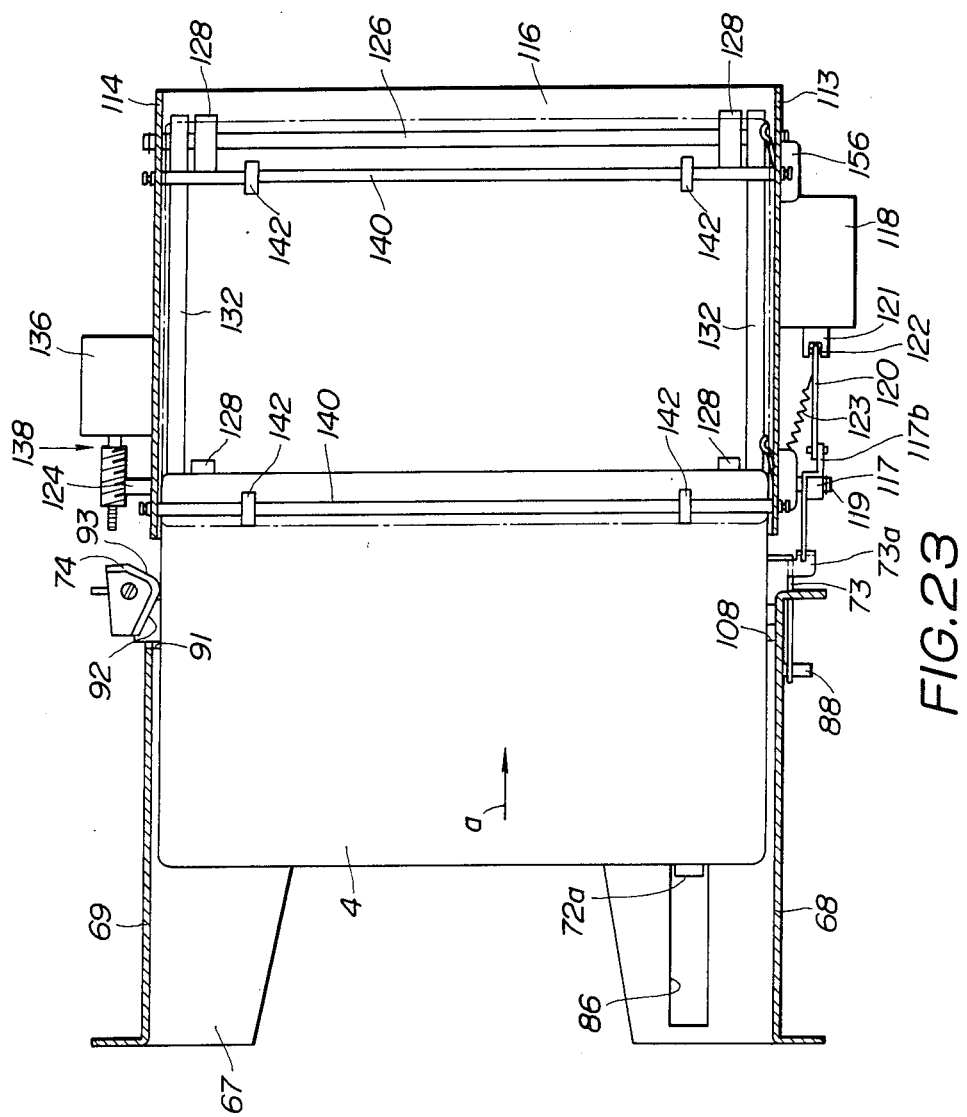
FIG. 23 is a sectional view taken along the line XXIII—XXIII on FIG. 21.

Therefore, tape cassette 4 is automatically conveyed further into cassette transfer passage 15 to a position shown in broken lines in FIGS. 21 and 23. During such movement of cassette 4 in transfer passage 15 by feed rolls 130 and timing belts 132, idler rollers 142 are urged downwardly against the upper surface of the tape cassette by springs 146 so as to avoid slippage between the cassette being transferred and feed rolls 130 and timing belts 132. It is to be noted that, as soon as the trailing end of the tape cassette 4 being extracted from storage compartment 5 clears opening 70, detection member 74 is free to be returned by the force of spring 103 in the direction of the arrow i' from the position of FIG. 16 to the position shown on FIG. 15. Simultaneously with such movement of detection member 74 by the force of spring 103, stopper locking plate 105 is driven by spring 109 in the direction of arrow k on FIG. 15 so that the leading end portion of stopper locking plate 105 is projected above stopper 73 which is then being held in its lowered or inoperative position by actuating lever 117. Thus, stopper 73 is thereafter held or locked in its lowered or inoperative position by the leading end portion of stopper locking plate 105.

When tape cassette 4 has been moved within cassette transfer passage 15 to the position shown in broken lines on FIGS. 21 and 23, the forward part of the tape cassette is detected by a sensor 156 mounted on side plate 113 and which is then operative to deenergize solenoid 118 and to halt the operation of electric motor 136. As a result, actuating lever 117 is returned by spring 123 to its raised or inoperative position shown in broken lines on FIG. 21, and the operation of feed rolls 130 and timing belts 132 is halted. As earlier noted, even though actuating lever 117 is raised to its inoperative position, stopper 73 is retained in its lowered or inoperative position by the stopper locking plate 105.

The operation of cassette transfer device 10 in automatically returning a tape cassette 4 from cassette transfer passage 16 to a cassette storage compartment 5 from which it had been previously removed in the manner described above, will now be explained with reference to FIGS. 24A, 24B and 25. Initially, cassette transfer member 17 is positioned so that its cassette transfer passage 16 is aligned with opening 70 of the cassette storage compartment 5 into which the tape cassette is to be returned, as shown on FIG. 24A. Then, driving motor 137 is energized to rotate driving shaft 125 in the direction for effecting movement of timing belts 133 in the direction of the arrow r. The combined action of the rotated feed rolls 131 on shaft 125 and belts 133 serves to drive the tape cassette 4 thereon through passage 16 in the direction of the arrow r. Thus, the tape cassette 4 is pushed-out, rear end first, through exit opening 148, as indicated by the solid lines on FIG. 24A and is propelled into the aligned compartment 5 through the opening 70 of the latter. During such movement of the tape cassette by feed rolls 131 and belts 133, idler rolls 143 are pressed downwardly on the upper surface of the tape cassette by springs 147 so as to avoid slippage of the drive rolls 131 and belts 133 relative to the bottom surface of cassette 4.

Figure 24B:
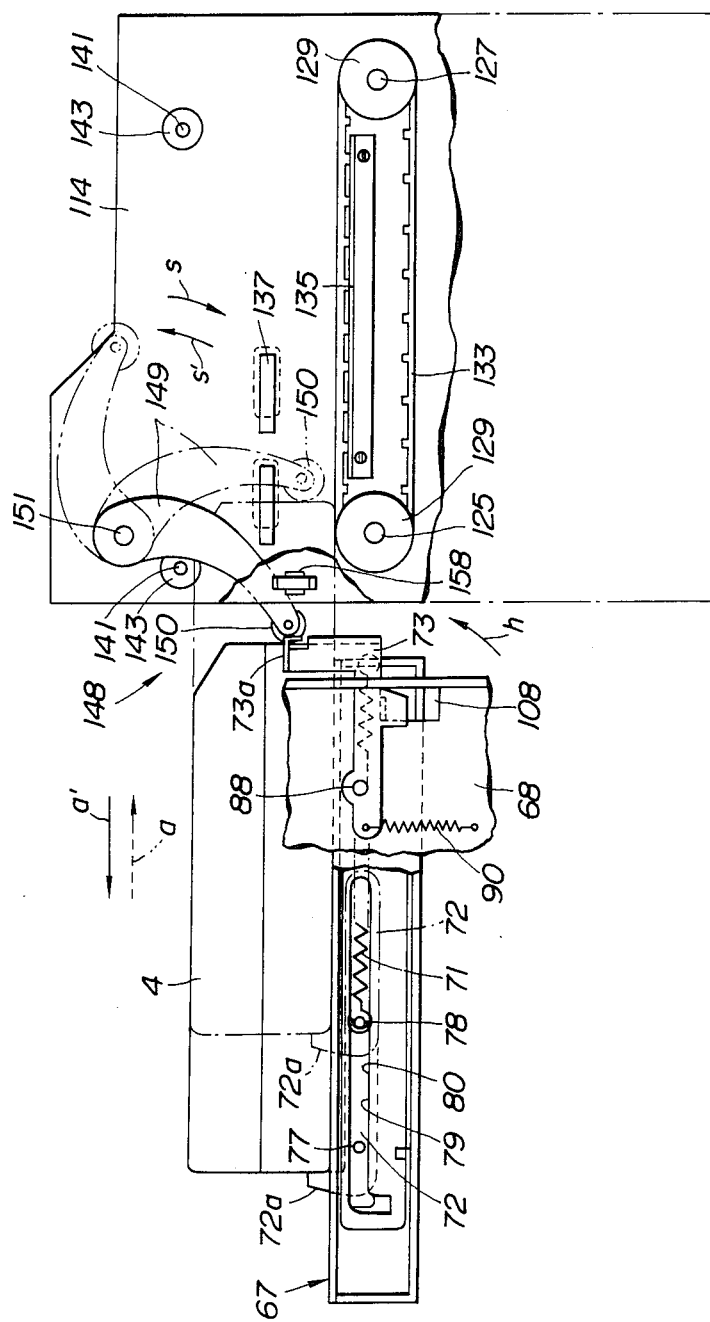
Figure 25:
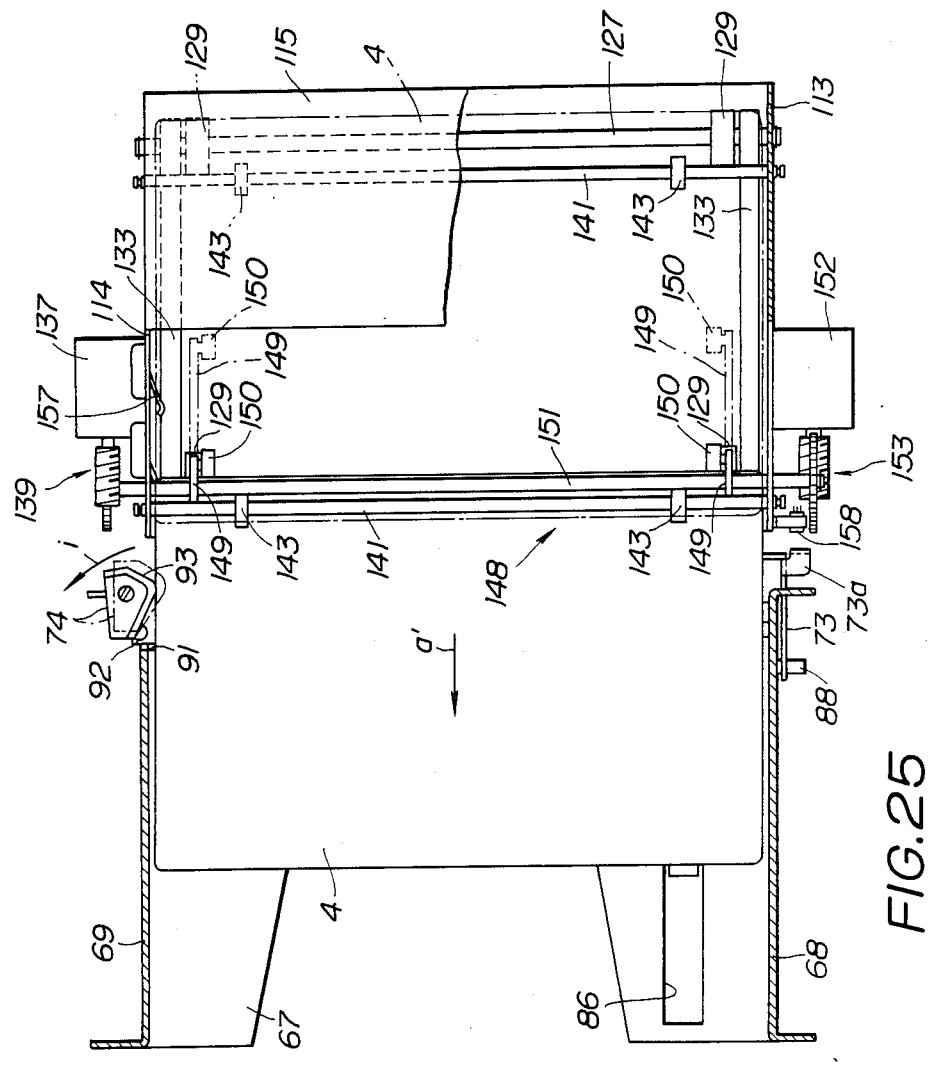
FIG. 25 is a top plan view of the cassette transfer device as viewed in the direction of the arrows XXV—XXV on FIG. 24A.

As the rear end of tape cassette 4 enters compartment 5 through opening 70, a rear end corner of the cassette acts against inclined surface 93 of detection member 74 so that the latter is turned in the direction of the arrow i' on FIG. 25 from the position shown on FIG. 15 to the position shown on FIG. 16 against the force of spring 103. In response to such movement of detection member 74, stopper locking plate 105 is longitudinally displaced in the direction of the arrow k' on FIG. 16 against the force of spring 109 and is thereby removed from engagement with stopper 73 so as to release the latter for return by spring 90 toward its operative position shown in full lines on FIG. 24B. However, until the cassette 4 being inserted into compartment 5 has attained its fully inserted position shown in full lines on FIG. 24B, the released stopper 73 engages slidably against the bottom surface of the tape cassette 4 being inserted, as shown in broken lines on FIG. 24A. Thus, the insertion of tape cassette 4 into cassette storage compartment 5 can continue in the direction of the arrow a' on FIG. 24B without interference from stopper 73.

As the tape cassette 4 is being thus fed from passage 16 of transfer device 10 into a compartment 5 in the direction of arrow a' on FIG. 21A, the rear end of the cassette, that is, the leading end as it moves in the direction of the arrow a', abuts against the hook 72a of push-out member 72 which had been previously shifted to its extended position shown in full lines on FIGS. 24A and 25. Immediately before such abutment of the tape cassette 4 against hook 72a, a sensor 157 (FIG. 22) attached to side plate 114 detects the trailing end of the tape cassette 4 being moved in the direction of the arrow r and, in response thereto, motor 152 is energized in the forward direction, that is, in the direction for turning shaft 151 and arms 149 thereon in the direction of arrow s on FIG. 24B. In response to such turning of arms 149 in the direction of the arrow s, rolls 150 at the free ends of arms 149 are brought against the trailing end of tape cassette 4 to continue the movement of the tape cassette 4 in the direction of the arrow a' off belts 133 and to the fully inserted position of cassette 4, as shown in full lines on FIG. 24B. During such further movement of cassette 4 by the action of rolls 150 on arms 149, the cassette thrusts against hook 72a of push-out member 72 so that the latter is displaced by the cassette in the direction of the arrow a' against the force of springs 71.

When tape cassette 4 is completely inserted into compartment 5, that is, attains the position shown in solid lines on FIG. 24B, the forward end of the cassette, that is, the end adjacent opening 70, moves off stopper 73 and frees the latter to be raised by spring 90 to its operative position for blocking the movement of the cassette out of opening 70. A sensor 158 (FIGS. 24B and 24A) is attached to cassette transfer member 17 and senses when arms 149 have returned the tape cassette 4 to its fully inserted position in compartment 5 so that stopper 73 has been free to return to its raised or operative position for blocking movement of the cassette out of opening 70. When sensor 158 thus detects that tape cassette 4 has been completely returned or inserted into cassette storage compartment 5, the operation of motor 137 is halted and, at the same time, the direction of operation of motor 152 is reversed so that arms 149 are returned in the direction of arrow s' on FIG. 24B to the inoperative position shown in broken lines on FIG. 21. When arms 149 attain such inoperative positions, the operation of motor 152 is halted. Upon the return of arms 149 to their inoperative positions, push-out member 72 again tends to push tape cassette 4 out of the respective compartment 5 through the opening 70. However, such ejection of the tape cassette 4 through opening 70 of compartment 5 is prevented by stopper 73 in its operative position.

Having described in detail the manner in which a tape cassette 4 is transferred between a compartment 5 of cassette storage shelf portion 7 and cassette transfer device 10, is will be appreciated that a tape cassette is similarly transferred between a compartment 5 of cassette shelf portion 6 and cassette transfer device 10, so that a detailed description of these additional operations is omitted for the sake of simplicity.

Cassette Delivery Unit

The cassette delivery units 11 and 13 respectively provided between the adjacent cassette storage shelf blocks $1_1$ and $1_2$ and $1_2$ and $1_3$, and between VTR housing block 3 and cassette storage shelf portion 6 of the adjacent cassette storage shelf block $1_1$, are of identical construction, so that only the cassette delivery unit 11 will be described in detail herein with reference to FIGS. 26–30. Each cassette delivery unit 11 includes a rectangular frame 160 dimensioned to be housed in the housing section 12 in place of cassette storage compartments 5 at the adjoining portions of cassette storage shelf portions 6 of blocks $1_1$ and $1_2$, or of blocks $1_2$ and $1_3$. A cassette feed table 161 is mounted movably within frame 160 so as to be capable of delivering a tape cassette 4 between cassette storage shelf portions 6 of blocks $1_1$ and $1_2$ or of blocks $1_2$ and $1_3$.

Frame member 160 is opened at the side thereof facing cassette transfer device 10 so as to define a cassette insertion and removal opening 162 through which a tape cassette 4 can be readily transferred between cassette transfer member 17 of unit 10 and cassette feed table 161.

Cassette feed table 161 is shown to have a slide block 163 at the bottom thereof which is slidable along a horizontal guide shaft 168 supported, at its ends, by upright end pieces 166 and 167 of a U-shaped supporting frame 165 which is securely mounted, in turn, on a bottom plate 164 of frame member 160. Cassette feed table 161 is movable between a first position shown in solid lines on FIG. 26, and which may be adjacent cassette storage shelf portion 6 of block $1_1$ or $1_2$, in the case of the delivery unit 11 between shelf blocks $1_1$ and $1_2$, and a second position shown in broken lines on FIG. 26, and which is adjacent cassette storage shelf portion 6 of the other block $1_2$ or $1_1$, respectively.

Generally, cassette feed table 161 is moved between the above noted first and second positions for delivering a tape cassette 4 thereon from one to the other of the adjoining cassette storage shelf blocks $1_1$ and $1_2$, and delivery unit 11 is further operative at each of the described first and second positions of its table 161 to effect transfer of a tape cassette between table 161 and the cassette transfer device 10 associated with the block $1_1$ or $1_2$, respectively.

The structure of cassette feed table 161 for performing the above functions is shown to include a pair of cassette guides 172 and 173 attached to opposite sides of table 161 for receiving and guiding a tape cassette 4 therebetween. Between guides 172 and 173 there is provided a first cassette receiving plate 174 onto which a tape cassette 4 is introduced in the direction of the arrow P (FIG. 27) from the cassette transfer device 10. The first cassette receiving plate 174 has a rim or flange 175 acting as a stopper engageable by the leading end of a cassette inserted in the direction of the arrow P and acting for limiting the inserting movement of the cassette relative to plate 174. Slide guide shafts 176 and 177 which are axially aligned with each other project from opposite sides of cassette receiving plate 174 and are slidably received in elongated guide slots 178a and 179a extending through and along base portions of cassette guides 172 and 173, respectively. Further, guide pins 178 and 179 project in opposite directions from plate 174 and are slidably received in elongated guide slots 178a and 179a, respectively. Thus, cassette receiving plate 174 is mounted for sliding movement relative to table 161, for example, between the positions shown on FIGS. 27 and 29, respectively.

A second cassette receiving plate 180 is provided on table 161 between table 174 and cassette insertion and removal opening 162, that is, at the portion of table 161 facing toward cassette transfer device 10. Along the side of cassette receiving plate 180 facing away from plate 174, there is provided an upstanding rim or flange 181 for engaging an end of a tape cassette 4 inserted on table 161 in the direction of the arrow P on FIG. 30 so as to inhibit its removal from table 161 in the opposite direction, that is, in the direction of the arrow Q. The second cassette receiving plate 180 is mounted for rocking on a supporting shaft 182 which extends along the edge of plate 180 remote from rim 181, and which has its end portions journaled in base portions of cassette guides 172 and 173. Rocking of cassette receiving plate 180 is controlled by cam-follower rolls 183 and 184 rotatably mounted at opposite ends of plate 180 between rim 181 and supporting shaft 182, and being engageable, from above, with a slidable cam plate 185. Cam plate 185 is mounted for reciprocal limited movement relative to table 161 in the direction of the arrows P and Q, for example, by means of pins 186 and 187 fixed relative to table 161 and being slidably received in slots 188 and 189 formed in cam plate 185. The portion of cam plate 185 underlying the second cassette receiving plate 180 is formed with inclined cam sections 190 and 191 engageable by cam follower rolls 183 and 184, respectively. Thus, by effecting movement of cam plate 185, the second cassette receiving plate 180 is rocked between the positions shown on FIGS. 28 and 30, respectively.

Tension springs 192 and 193 are connected, at one end, to guide shafts 176 and 177, respectively, and the other ends of springs 192 and 193 are connected to end portions of shaft 182. Thus, springs 192 and 193 urge first cassette receiving plate 174 toward second cassette receiving plate 180, for example, to the relative position shown on FIGS. 27 and 28.

Figure 29:
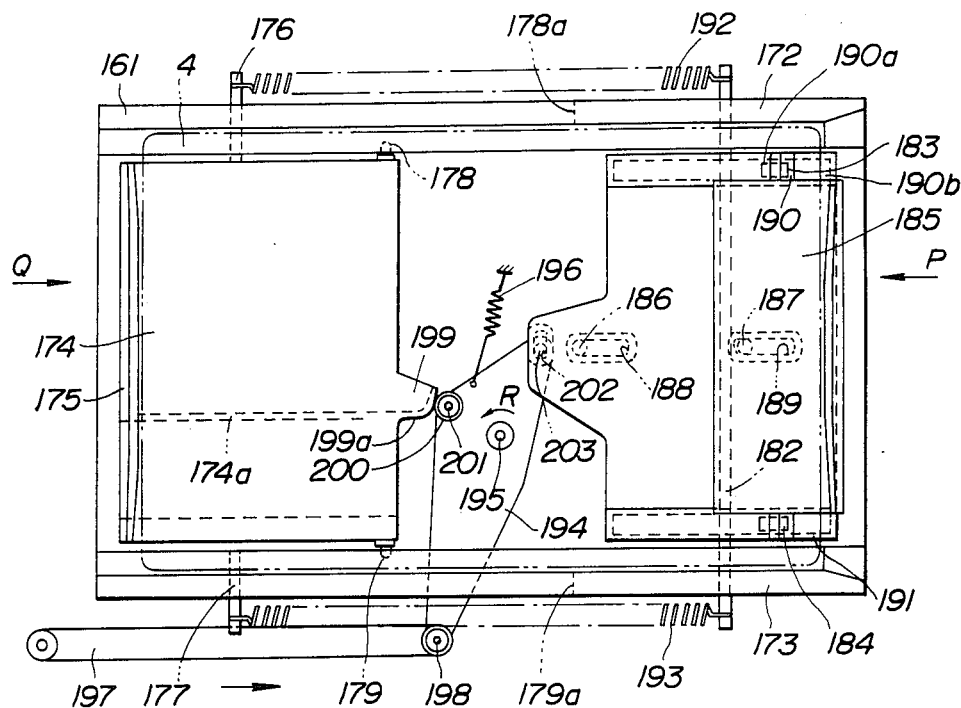
FIG. 29 is a plan view similar to that of FIG. 27, but showing the cassette feed table in the condition thereof with a tape cassette situated on the table.
Figure 30:
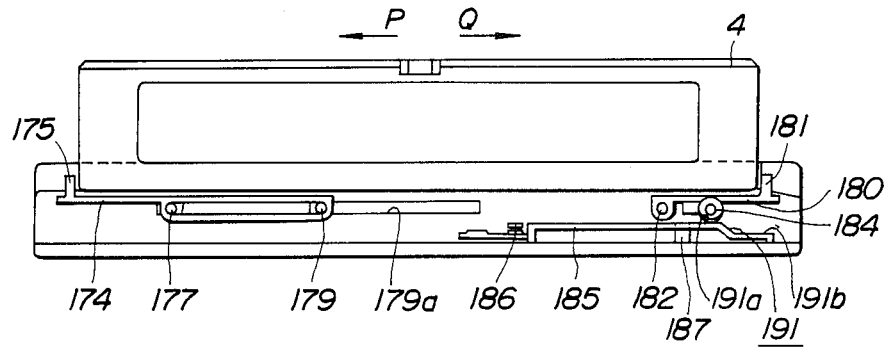
FIG. 30 is a side view of the cassette feed table in the condition of FIG. 29.

Cassette feed table 161 is further provided with an operating lever 194 which is mounted for rotation on a shaft 195 supported by feed table 161 and biased to turn in the clockwise direction, that is, the direction of the arrow R on FIG. 29, by means of a tension spring 196 connected between lever 194 and table 161. One end portion of lever 194 extends beyond table 161 at the side of the latter having guide 173 thereon and carries a pin 198 to which a horizontally extending link 197 is pivotally connected. Link 197 is shown to extend parallel to cassette guide 173 and is adapted to be shifted longitudinally for turning lever 194 about its supporting shaft 195. At one side of lever 194 at a suitable radial distance from supporting shaft 195, there is provided an actuating roll 200 rotatable on a shaft 201 and adapted to abut against a projection 199 extending from the inner side of the first cassette receiving plate 174. A bent flange 199a is formed along the edge of projection 199 to provide a bearing surface for engagement by roll 200 and leads into a guide flange 174a extending along the undersurface of cassette receiving plate 174. The end of operating lever 194 remote from pin 198 carries a pin 203 engaging in a laterally elongated slot 202 formed in cam plate 185.

Figure 27:
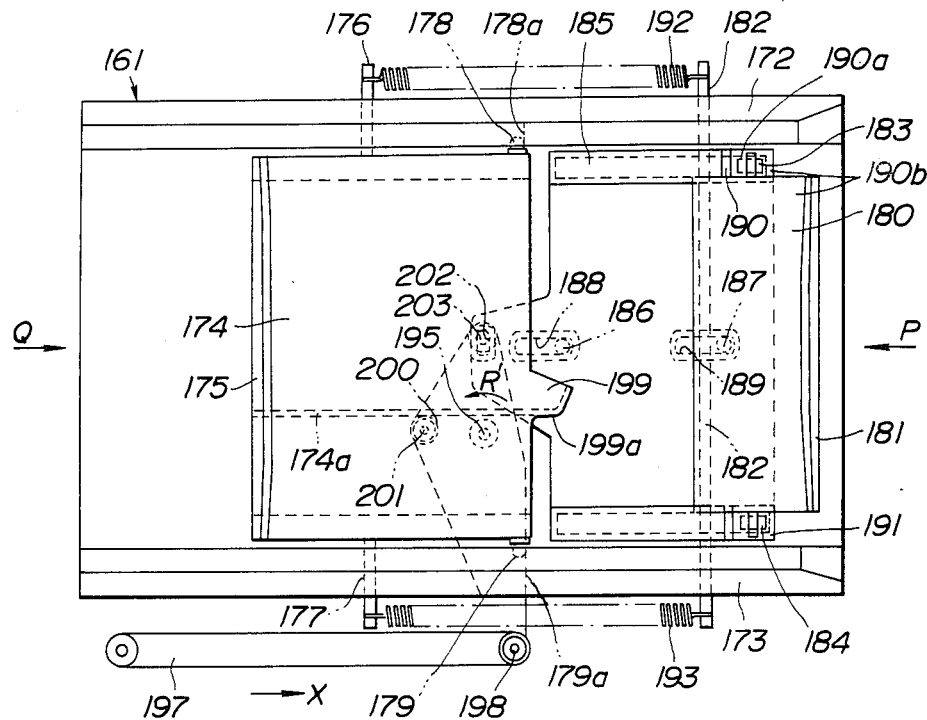
FIG. 27 is a top plan view of a cassette feed table included in the delivery unit of FIG. 26 and which is shown in the condition thereof for the insertion or discharge of a tape cassette.

It will be appreciated that turning of operating lever 194 is effective to simultaneously displace first cassette receiving plate 174 and cam plate 185 between the positions shown on FIGS. 27 and 29, respectively.

Figure 28:
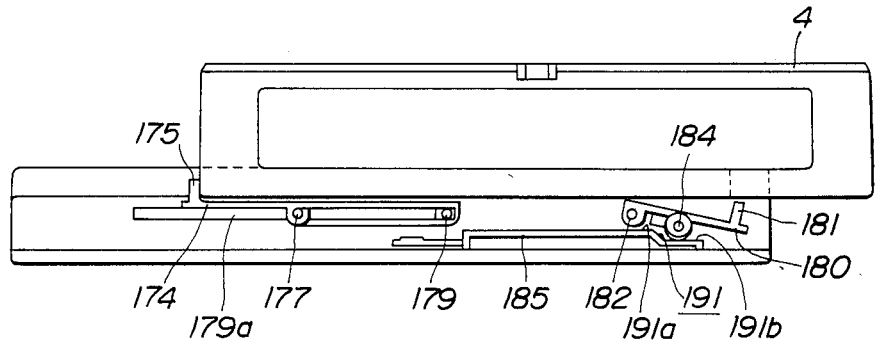
FIG. 28 is a side elevational view of the cassette feed table of FIG. 27.

More particularly, when a tape cassette 4 is to be inserted on table 161, operating lever 194 is in the position shown on FIG. 27 so that actuating roll 200 on operating lever 194 is disengaged from projection 199 of first cassette receiving plate 174 which is thereby moved toward second cassette receiving plate 180 by the force of tension springs 192 and 193. With operating lever 194 in the position shown on FIG. 27, pin 203 thereon causes displacement of cam plate 185 in the direction of the arrow P so that cam follower rolls 183 and 184 are positioned on the relatively lower horizontal surfaces 190b and 191b of cam sections 190 and 191, respectively. As a result, second cassette receiving plate 180 is rocked or inclined downwardly from its support shaft 182 so that its rim 181 is at a relatively depressed position (FIG. 28).

When a tape cassette 4 is introduced onto table 161 from the side thereof at which second cassette receiving plate 180 is situated, that is, in the direction of the arrow P, the leading end of the tape cassette abuts against stopper or rim 175 on first cassette receiving plate 174. Thus, as the tape cassette 4 is further inserted, first cassette receiving plate 174 is moved thereby in the direction of the arrow P against the bias of tension springs 192 and 193 with roll 20 riding along flange 174a until plate 174 arrives at its tape cassette inserting position (FIGS. 29 and 30) in which slide guide shafts 176 and 177 abut against respective ends of elongated guide slots 178a and 179a. When cassette receiving plate 174 attains its cassette inserting position (FIG. 29), actuating roll 200 moves off flange 174a and spring 196 turns lever 194 in the direction of the arrow R to engage roll 200 with flange 199a on projection 199. Further, by such movement of lever 194 by spring 196 in the direction of the arrow R, pin 202 on lever 194 causes movement of cam plate 185 in the direction of the arrow Q so that cam-follower rollers 183 and 184 on the second cassette receiving plate 180 move along the inclined cam sections 190 and 191 and come to rest on the upper horizontal surfaces 190a and 191a, respectively. As a result of the foregoing, second cassette receiving plate 180 is rocked upwardly about supporting shaft 182 to the horizontal position shown on FIG. 30, and at which rim 181 on plate 180 engages the adjacent end of tape cassette 4 for retaining the latter between flanges or rims 175 and 181.

After lever 194 has been moved in the direction of arrow R by spring 196 so as to engage roll 200 with projection 199 on cassette receiving plate 174, the force of springs 192 and 193 tending to move plate 174 in the direction of arrow Q causes projection 199 to act on roll 200 along a line spaced from the pivoting axis of lever 194 in the direction to turn lever 194 in the direction of the arrow R, that is, in the same direction as spring 196. Thus, after the first cassette receiving plate 174 has attained its cassette inserting position, lever 194 is automatically retained in the position illustrated on FIG. 29 to hold plate 174 in such position against the urging of springs 192 and 193. As a result, the introduced tape cassette 4 is held on first and second cassette receiving plates 174 and 180 between rims 175 and 181, as shown on FIGS. 29 and 30.

Figure 26:
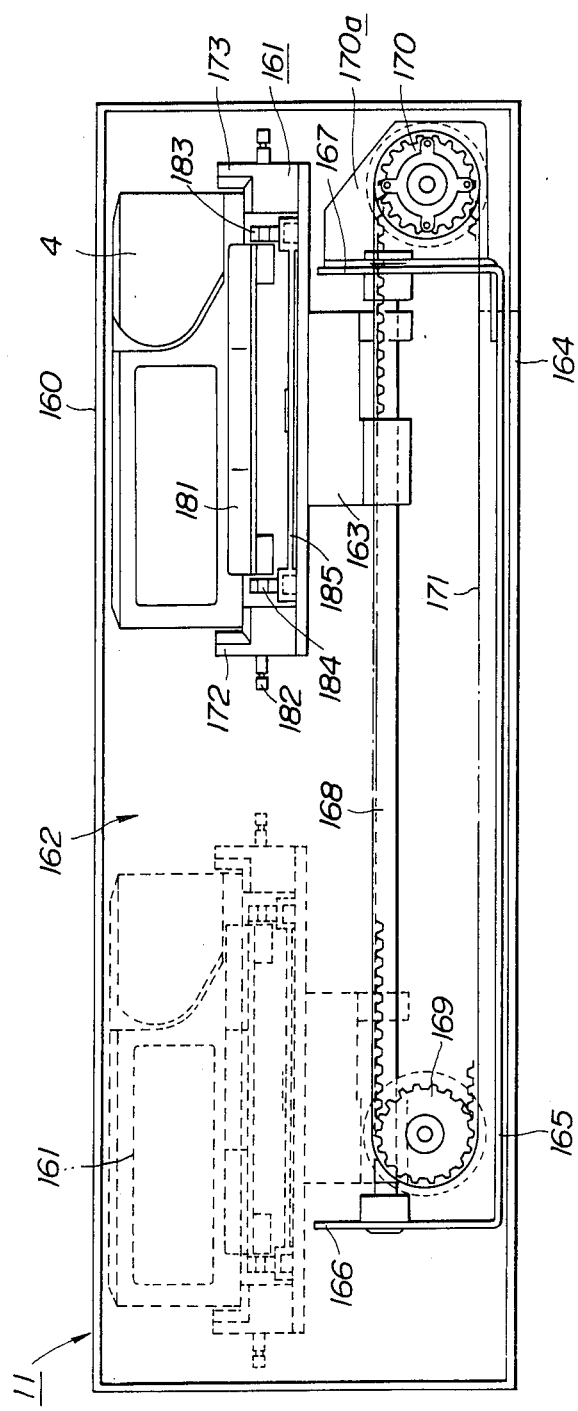
FIG. 26 is a front elevational view of a cassette delivery unit included in the device according to this invention.

As shown particularly on FIG. 26, movements of cassette feed table 161 between the positions shown in full lines and in broken lines, respectively, are effected by a feed mechanism including toothed pulleys or sprockets 169 and 170 rotatably mounted on supporting frame 165 adjacent the opposite end pieces 166 and 167 thereof, a timing belt 168 running around sprockets 169 and 170 and having its upper run suitably fixed to slide block 163, and a drive unit 170a including a conventional reversible electric motor and speed reduction gearing for rotatably driving sprocket 170. Thus, by suitably operating drive unit 170a, slide block 163, and hence table 161 thereon are driven along guide shaft 168 to effect delivery of a tape cassette 4 on table 161, for example, between cassette storage shelf blocks $1_1$ and $1_2$.

After cassette feed table 161 has been displaced along guide shaft 168, the tape cassette 4 thereon is discharged from feed table 161 into the cassette transfer device 10 associated with the cassette storage shelf block $1_1,1_2$ or $1_3$ to which table 161 has been fed. More particularly, in order to discharge tape cassette 4 from feed table 161, horizontally extending link 197 is suitably displaced longitudinally in the direction of the arrow x on FIG. 29 to effect counterclockwise turning of operating lever 194 with the result that roll 200 is disengaged from projection 199 on cassette receiving plate 174. As a result of the foregoing, springs 192 and 193 can act on cassette receiving plate 174 for moving the latter in the direction of the arrow Q from the position shown on FIG. 29 toward the position shown on FIG. 27. The counterclockwise turning of operating lever 194 in the direction of the arrow R' on FIG. 27 also effects movement of cam plate 185 in the direction of the arrow P so that cam-follower rolls 183 and 184 are engaged by the inclined cam surfaces 190 and 191 and then by the lower horizontal surfaces 190b and 191b, respectively. Thus, cassette receiving plate 180 is rocked downwardly about its supporting shaft 182, as shown on FIG. 28, for disengaging rim 181 from tape casserte 4. Thus, springs 192 and 193 can now displace cassette receiving plate 174 in the direction of the arrow Q from the position shown on FIGS. 29 and 30 to the position shown on FIGS. 27 and 28 with the result that rim or flange 175 on plate 174 propels tape cassette 4 at least partly off feed table 161, and at least partly into cassette transfer passage 15 of transfer device 10. Thereafter, transfer device takes over the completion of the insertion of cassette 4 into passage 15 in the same way as was described before in respect to the discharge of a cassette from a compartment 5 into transfer device 10. As cassette receiving plate 174 is moved by springs 192 and 193 from the position of FIG. 29 to the position of FIG. 27, roll 200 engages against the side of flange 174a to hold lever 194 against turning by spring 196.

It will be appreciated that, after delivery unit 11 has received a tape cassette 4 from the transfer device 10 associated with one of the storage shelf blocks $1_1, 1_2$ and $1_3$, for example, the block $1_1$, and then discharged such cassette into the transfer device 10 associated with the next adjacent cassette storage shelf block, for example, the block $1_2$, such transfer device 10 which receives the cassette can be shifted and operated, as previously described for depositing the cassette into a desired cassette storage compartment 5 of the block $1_2$.

Automatic Input and Output Device

Each of the VTRs $2_1, 2_2, 2_3$ and $2_4$ contained in the VTR housing block 3 has an automatic cassette input and output device 227 which is in facing relation to a cassette inlet and outlet opening 226 (FIG. 35) of the respective VTR. The automatic cassette input and output device 227 associated with the VTR $2_1$ will be described in detail herein with reference to FIGS. 31–35, and it will be understood that the other VTRs have identical automatic input and output devices associated therewith.

In general, the purpose of device 227 is to effect the input into opening 226 of VTR $2_1$ of the tape cassette 4 which is discharged from cassette delivery unit 13, or to effect the output from opening 226 of a cassette 4 ejected from VTR $2_1$, and the introduction of such ejected cassette into cassette delivery unit 13.

Figure 31:
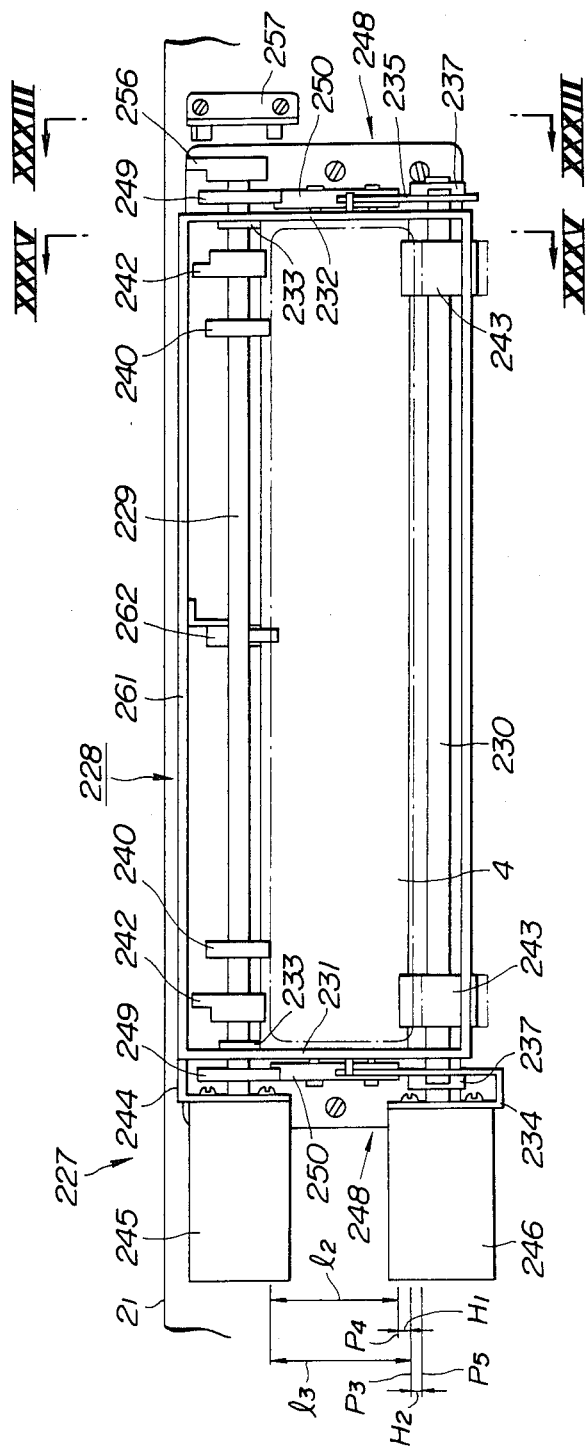
FIG. 31 is a front elevational view of an automatic cassette input and output device associated with each VTR in the arrangement according to this invention.
Figure 35:
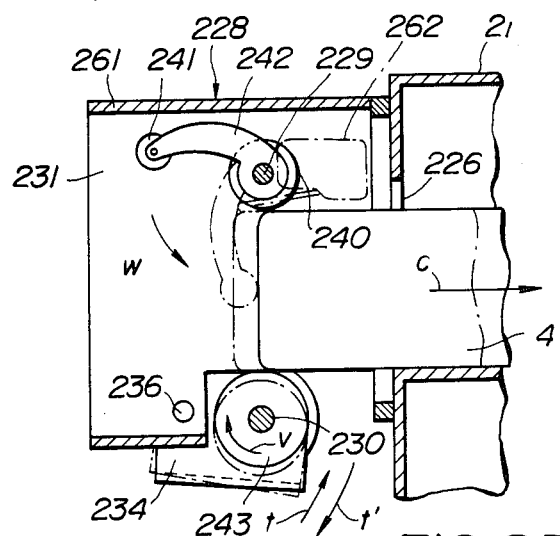
FIG. 35 is a sectional view taken along the line XXXV—XXXV on FIG. 31.

The automatic cassette input and output device 227 is shown to have a substantially rectangular frame 228 attached to the front surface of the housing of VTR $2_1$ about the opening 226, as shown on FIGS. 31 and 35. Within frame 228 there are disposed an upper shaft 229 and a lower shaft 230 extending horizontally and parallel to each other above and below, respectively, the path of the cassettes into and out of opening 226. The upper shaft 229 has its opposite end portions extending through and being rotatably supported by bearings 233 secured to upper parts of opposed side members 231 and 232 of frame 228. Thus, upper shaft 229 is mounted for rotation about a fixed axis. The lower shaft 230 is mounted for rotation about an axis which is capable of limited displacements in the vertical direction. More particularly, bell-cranks 234 and 235 are situated outside of side members 231 and 232, respectively, and are pivotally mounted on pins 236 supported by the lower parts of the adjacent side members 231 and 232 of frame 228. Such bell-cranks 234 and 235 have approximately horizontally extending arms carrying bearings 237 in which the adjacent ends of lower shaft 230 are rotatably mounted. The other, or approximately vertically extending arms of bell-cranks 234 and 235 are connected to springs 238, by which bell-cranks 234 and 235 are urged to pivot about their respective pins 236 in the direction of the arrow t on FIGS. 33 and 35.

Idler rollers 240 are mounted on opposite end portions of upper shaft 229 within frame 228 so as to be freely rotatable in respect to shaft 229. Also mounted on the opposite end portions of shaft 229 between side frame members 231 and 232, are arms 242 which, however, are secured to shaft 229 for turning with the latter. The free ends of rotary arms 242 have rollers 241 rotatably mounted thereon.

Feed rolls 243 are secured on the opposite end portions of lower shaft 230 within frame 228. A reversible electric motor 245 is mounted on side frame member 231 by way of a bracket 244 and is suitably coupled with the adjacent end of shaft 229 for driving the latter. Another reversible electric motor 246 is mounted on the substantially horizontal portion of bell-crank 234 which, as shown on FIG. 31, is desirably of U-shaped cross-section. Motor 246 is suitably coupled with the adjacent end of shaft 230 for rotating the latter.

Automatic roll-lifting devices 248 are provided at the side frame members 231 and 232 for controlling the vertical position of shaft 230, and hence of feed rolls 243 thereon. Each of these roll-lifting devices 248 includes a rotary cam 249 secured to the adjacent end of upper shaft 229, and a cam-following slide plate 250 which is mounted for vertical movement on the adjacent side frame member 231 or 232 between the respective cam member 249 and the bell-crank 234 or 235. Each cam 249 is shown on FIGS. 32–34 to be in the form of a substantially circular disc having a recess or cut-out 251 in its otherwise circular periphery 239a. Each slide plate 250 has elongated slots 253 therein slidably receiving mounting pins 252 extending from the adjacent side frame member 231 or 232 for permitting the vertical movement of slide plates 250. Each slide plate 250 has a rounded upper end bearing against the peripheral surface of the respective cam 249, while the lower end of each slide plate 250 is engaged from below by the substantially horizontal arm portion of the respective bell-crank 234 or 235. It will be appreciated that the springs 238, in urging bell-cranks 234 and 235 to pivot in the direction of the arrow t on FIG. 33 also urge slide plates 250 vertically upward in the direction of the arrow u for engagement, at their upper ends, with the peripheries 249a of cams 249.

Figure 32:
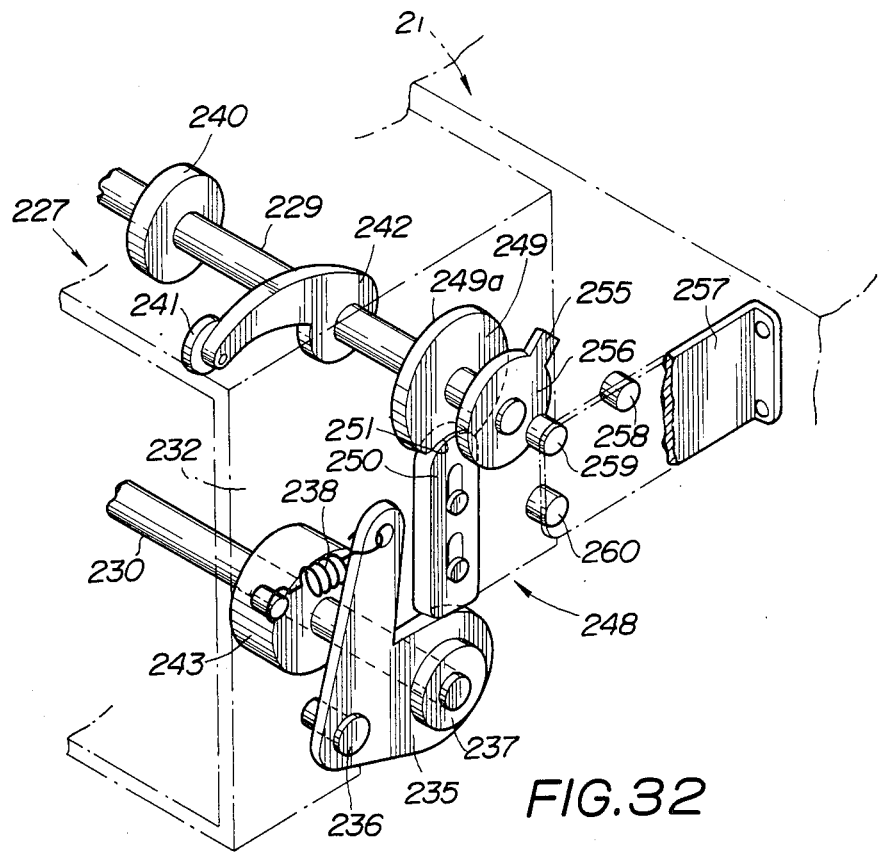
FIG. 32 is an enlarged, fragmentary perspective view of an automatic roll lifting mechanism included in the device of FIG. 31.
Figure 33:
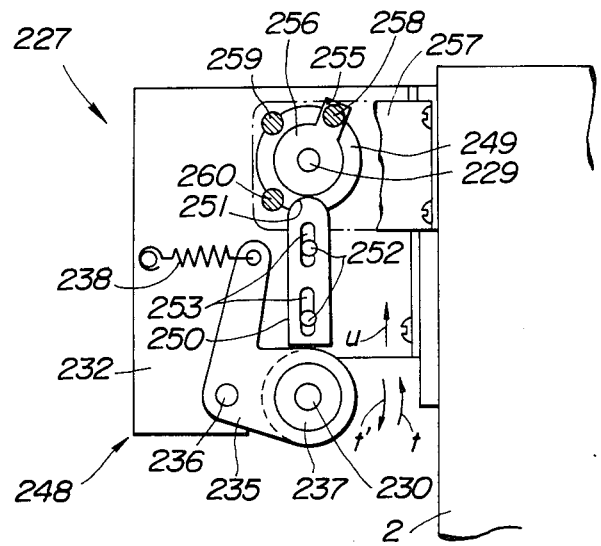
FIG. 33 is a side elevational view of the device shown on FIG. 31 as viewed in the direction of the arrows XXXIII—XXXIII, and to which reference will be made in explaining the operation for automatic cassette delivery into a VTR.
Figure 34:
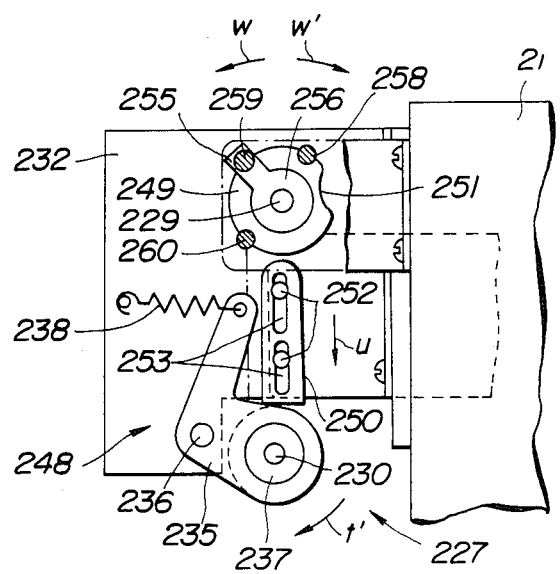
FIG. 34 is a view similar to that of FIG. 33, but showing another stage the operation.

To the end of shaft 229 extending outwardly from side frame member 232 there is secured a rotary disc 256 having a peripheral projection 255 (FIGS. 32–34). A sensor attachment plate 257 (FIGS. 31 and 32) extends from the front of the housing of VTR $2_1$ parallel to side frame member 232 in the vicinity of rotary disc 256 and carries three spaced apart sensors 258, 259 and 260 for sensing three respective rotational positions of projection 255. It will be noted that projection 255 on disc 256 is rotated in phase with rotary arms 242 so that the rotational position of the latter can be detected by sensors 258–260 with reference to the rotational position of projection 255. Another sensor 262 (FIGS. 31 and 35) depends from the central portion of the top frame member 261 of frame 228 and is adapted to detect positions of a tape cassette passing through the opening 226 of VTR $2_1$, as hereinafter described in detail.

The operation of device 227 in automatically inserting into opening 226 of VTR $2_1$ a tape cassette 4 delivered thereto by the respective cassette delivery unit 13 is as follows:

When cassette feed table 161 of unit 13 is positioned in front of opening 226, link 197 of unit 13 is suitably displaced in the direction of the arrow x on FIG. 27 so as to cause the previously described discharge of the tape cassette from table 161 in the direction toward opening 226, that is, into the frame 228. As the leading end of the discharged tape cassette nears feed rolls 243, motor 246 is suitably energized to drive shaft 230 on which rolls 243 are secured. At such time, rotary cams 249 on shaft 229 are rotationally positioned so that the peripheral recesses 251 thereof receive the upper ends of slide plates 250, as shown on FIGS. 32 and 33. As a result, feed rolls 243 are urged by springs 238 to their raised position $P_4$ at which the surfaces of feed rolls 243, at the top thereof, extend the distance $H_1$ above the bottom surface of the tape cassette 4 as driven into device 227 from delivery unit 13. As a result of the foregoing, the vertical distance $l_2$ measured between the bottom surfaces of idler rolls 240 on shaft 229 and the top surfaces of feed rolls 243 when in the position $P_4$, is less than the vertical dimension $l_3$ of tape cassette 4 (FIG. 31).

When the leading end of the tape cassette is propelled by feed table 161 of cassette delivery unit 13 between idler rolls 240 and feed rolls 243, the latter are displaced downwardly by tape cassette 4 in the direction of the arrow t' on FIG. 33 against the force of springs 238. Therefore, feed rolls 243, while being driven by motor 246, are pressed against the bottom surface of tape cassette 4 by the force of springs 238 with the result that the driving force of feed rolls 243 is positively transmitted to the tape cassette for introducing the latter through opening 226 into the conventional cassette holder (not shown) within VTR $2_1$.

When the tape cassette 4 has been introduced into VTR $2_1$ to the position shown in full lines on FIG. 35, sensor 262 detects the trailing end of the tape cassette and, in response thereto, the operation of motor 246 is halted and the operation of motor 245 is commenced so as to turn shaft 229 and arms 242, rotary cams 249 and rotary disc 256 in the direction of the arrow w on FIGS. 34 and 35. As cams 249 are turned from the position shown on FIG. 33, peripheral recesses 251 therein move away from the upper ends of slide plates 250 with the result that the latter are displaced downwardly in the direction of the arrow u' on FIG. 234 so as to turn bell-cranks 234 and 235 in the direction of the arrow t' and thereby move feed rollers 243 downwardly to the position $P_5$ (FIG. 31) in which the top surfaces of feed rolls 243 are spaced by the distance $H_2$ from the bottom surface of tape cassette 4. At the same time, rotary arms 242 are turned in the direction of the arrow w from their inoperative positions shown in full lines on FIG. 35 so that rolls 241 at the free ends of arms 242 will engage the trailing end of the tape cassette, as shown in broken lines, and thereby continue the automatic feeding of the tape cassette in the direction of the arrow c into VTR $2_1$. Such movement of the tape cassette by arms 242 continues until projection 255 on rotary disc 256 is detected by sensor 260, whereupon the operation of motor 245 is halted. At such time, the insertion of tape cassette 4 into the cassette holder of VTR $2_1$ has progressed to the extent necessary for conventionally initiating automatic loading of the cassette in the VTR and the reproducing or recording operation of the latter.

Upon completion of the video reproducing or recording operation, the tape cassette 4 within VTR $2_1$ is conventionally ejected automatically out of opening 226. At such time, rotary arms 242 are in the position shown in broken lines on FIG. 35 so that the ejected tape cassette 4 comes to rest at a predetermined position in which it abuts against rolls 241 on arms 242. Since the upper surfaces of feed rolls 243 are, at this time, in the lowered position $P_5$, that is, the distance $H_2$ below the position $P_3$ of the bottom surface of the tape cassette 4 being ejected, feed rolls 243 do not interfere with the ejection of tape cassette 4.

When the leading end (considering the direction in which the tape cassette is ejected) of the ejected tape cassette 4 is detected by sensor 262, motor 245 is operated in the direction to cause turning of shaft 229, and hence of arms 242, cams 249 and disc 256 thereon, in the direction of the arrow w' on FIG. 34. When arms 242 are returned to the inoperative position shown in full lines on FIGS. 32 and 35, projection 255 on disc 256 is returned to its original position (FIG. 33) where it is detected by sensor 258 and, in response thereto, the operation of motor 245 is halted.

Further, upon the return of arms 242 to their inoperative position, recesses 251 of cams 249 are disposed to receive the upper end portions of slide plates 250 so that bell-cranks 234 and 235 can be turned in the direction of the arrow t by springs 238, with the result that feed rolls 243 are pressed in the direction of the arrow u on FIG. 33 against the bottom surface of the tape cassette.

When cassette feed table 161 of delivery unit 13 is positioned in front of opening 226, driving motor 246 is operated in the direction for driving shaft 230 and feed rolls 243 thereon in the counterclockwise direction, that is, the direction opposed to the arrow v on FIG. 35. As a result of the foregoing, the ejected tape cassette 4 is fed out of opening 226 of VTR $2_1$ and is automatically introduced onto cassette feed table 161 in the manner previously described.

Operation of the Automatic Tape Cassette Selecting and Loading Device

In the operation of the above described automatic tape cassette selecting and loading device according to this invention, selected tape cassettes 4 to be reproduced by the VTRs $2_1, 2_2, 2_3,$—, are removed from the respective storage compartments 5 in shelf portions 6 and/or 7 of storage shelf blocks $1_1, 1_2, 1_3,$—, and carried by cassette transfer devices 10 traveling between the shelf portions 6 and 7 of the respective shelf blocks $1_1, 1_2, 1_3,$—. Each cassette transfer device 10 carries the tape cassette 4 deposited therein over the extent of the respective storage block $1_1, 1_2, 1_3,$—, in the direction toward the VTR housing block 3 and introduces the carried tape cassette 4 onto the cassette feed table 161 of the cassette delivery unit 11 or 13 associated with the respective storage block. Such delivery unit 11 or 13 effects the delivery of the tape cassette between adjacent cassette storage shelf blocks $1_1$ and $1_2$ or $1_2$ and $1_3$, or between cassette storage shelf block $1_1$ and VTR housing block 3, respectively. Each cassette thus introduced by cassette transfer device 10 onto the cassette feed table 161 of a cassette delivery unit 11 is shifted from one cassette storage shelf block to the next cassette storage shelf block in the direction toward VTR housing block 3, for example, from block $1_2$ to block $1_1$, whereupon the tape cassette is discharged from cassette feed table 161 into the cassette transfer member 17 of the cassette transfer device 10 associated with cassette storage block $1_1$. A tape cassette thus delivered by a delivery unit 11 from the transfer device 10 associated with storage block $1_2$ to the transfer device 10 associated with storage block $1_1$, is then carried by the last mentioned transfer device 10 and introduced therefrom onto the cassette feed table 161 of the cassette delivery unit 13 associated with the VTR $2_1, 2_2, 2_3$ or $2_4$ in which the selected tape cassette 4 is to be reproduced. Finally, that selected tape cassette 4 is discharged from the feed table 161 of the cassette delivery unit 13 and loaded into the corresponding VTR through the opening 226 of the latter by the respective automatic cassette input and output device 227.

It will be appreciated that a selected tape cassette 4 stored in a compartment 5 of cassette storage shelf block 1$_3$ would be removed from such compartment into the cassette transfer member 17 of the transfer device 10 associated with block 1$_3$ and transferred, by such device 10, to the table 161 of the cassette delivery unit 11 bridging blocks 1$_3$ and 1$_2$. The table 161 of that delivery unit 11 would, after shifting, deliver the tape cassette thereon to the cassette transfer device 10 associated with block 1$_2$, and such transfer device 10 would carry the tape cassette for introduction to the table 161 of the delivery unit 11 bridging cassette storage shelf blocks 1$_2$ and 1$_1$. From the last mentioned delivery unit 11, the tape cassette would be delivered to the cassette transfer device 10 associated with cassette storage shelf block 1$_1$ for transfer, by such device 10 to the delivery unit 13 bridging cassette storage shelf block 1$_1$ and VTR housing block 3 and from which the tape cassette is input to the selected VTR by way of the respective device 227, as earlier described.

It will be apparent from the above that, in the automatic tape cassette selecting and loading device according to the present invention, a number of selected tape cassettes 4 may be transferred simultaneously in the direction toward VTR housing block 3 by parallel operations of the cassette transfer devices 10 associated with the tape storage shelf blocks 1$_1$,1$_2$, and 1$_3$, respectively.

Similarly to the above, after the playback of a tape cassette 4 in one of the VTRs 2$_1$,2$_2$,2$_3$,2$_4$ has been completed, such tape cassette is introduced by the respective cassette input and output device 227 into the associated cassette delivery unit 13. The cassette is then delivered by unit 13 to the cassette transfer device 10 associated with the adjacent cassette storage shelf block 1$_1$ so as to be introduced by that transfer device 10 either into a compartment 5 of storage shelf block 1$_1$ or into delivery unit 11 bridging blocks 1$_1$ and 1$_2$. If the cassette is introduced into such delivery unit 11, the latter delivers the cassette to the transfer device 10 associated with cassette storage shelf block 1$_2$, which is then operative to transfer the cassette either to a storage compartment 5 of cassette storage shelf block 1$_2$ or to the delivery unit 11 bridging blocks 1$_2$ and 1$_3$. Finally, if the cassette is introduced into the cassette delivery unit 11 bridging blocks 1$_2$ and 1$_3$, the cassette is thereby fed to the cassette transfer device 10 associated with block 1$_3$ and which is operative to transfer the cassette to a selected compartment 5 of block 1$_3$. Thus, the tape cassettes reproduced in the VTRs are returned sequentially so as to be stored again in the respective storage compartments 5. During such return of the cassettes to the original storage compartments, the cassette transfer devices 10 associated with the cassette storage shelf blocks 1$_1$,1$_2$, and 1$_3$, respectively, can again operate simultaneously in parallel so that a cassette storage facility of very large capacity can be provided without unduly extending the time required between successive reproductions of the tape cassettes by the VTRs.

From the foregoing, it will be seen that the present invention provides an automatic tape cassette selecting and loading device in which the insertion or removal and transfer of the tape cassettes are carried out by parallel operations for the several cassette storage shelf blocks, respectively, with tape cassette deliveries being effected between the adjacent cassette storage shelf blocks and between the VTR housing block and the adjacent cassette storage shelf block. As a result, even when the tape cassette storage capacity is greatly increased, it is possible to effect the necessary operations for insertion and removal of the tape cassettes into and out of the cassette storage compartments in a manner to permit video reproduction and/or recording to be effected for short durations consecutively on a relatively small number of VTRs. Further, since the cassette storage shelves are arranged in block form, the numbers of the shelves can be increased or decreased by adding or subtracting blocks, as desired, while the overall arrangement of the device otherwise remains unchanged.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An automatic tape cassette loading device comprising:

a plurality of cassette storage shelf blocks arranged in a row in adjoining side-by-side relation and each including plural tiers of cassette storage compartments for containing respective tape cassettes;

a cassette transfer device for each of the cassette storage shelf blocks adapted to selectively insert and remove a tape cassette in each of the cassette storage compartments of the respective cassette storage shelf block and to transfer each removed tape cassette in vertical and horizontal directions through distances limited to the extent of the respective cassette storage shelf block in said directions;

a video tape recorder housing block mounted adjacent an end of said row of the cassette storage shelf blocks and containing at least one video tape recorder adapted to at least reproduce signals recorded in a tape cassette delivered thereto from one of the cassette storage shelf blocks;

a cassette delivery unit contained within and extending between each two adjoining side-by-side cassette storage shelf blocks and occupying the spaces of two of said cassette storage compartments in the respective to adjoining side-by-side cassette storage shelf blocks, each said cassette delivery unit being operative to deliver a tape cassette from one another of the cassette transfer devices associated with said respective two adjoining cassette storage shelf blocks when said cassette transfer devices are in registry with said spaces occupied by said cassette delivery units; and an additional cassette delivery unit contained within and extending between said video tape recorder housing block and the cassette storage shelf block adjacent thereto and occupying the space of one of said cassette storage compartments in said adjacent cassette storage shelf block and a similar space in said video tape recorder housing block, said additional cassette delivery unit being operative to deliver a tape cassette between said cassette transfer device associated with said adjacent cassette storage shelf block and said at least one video tape recorder.

2. An automatic tape cassette loading device according to claim 1; in which each of said cassette storage shelf blocks includes two storage shelf portions each containing said storage compartments and being spaced apart to define an aisle between said storage shelf portions through which the respective cassette transfer device is movable.

3. An automatic tape cassette loading device according to claim 2; in which one of said shelf portions of each of said cassette storage shelf blocks has openings facing away from said aisle and communicating with at least some of said compartments in said one shelf portion for permitting the manual insertion and removal of tape cassettes through said openings, and each of said cassette transfer devices is operative to transfer cassettes between said compartments communicating with said openings and other compartments in said one shelf portion and in the other of said two shelf portions of the respective cassette storage shelf block.

4. An automatic tape cassette loading device according to claim 1; in which said video tape recorder housing block contains a plurality of vertically stacked vidio tape recorders, and there is a said additional cassette delivery unit for each of the video tape recorders, with each said additional cassette delivery unit being operative to deliver a tape cassette between said space occupied thereby in said adjacent cassette storage block and the respective video tape recorder.

5. An automatic tape cassette loading device comprising:

a plurality of cassette storage shelf blocks arranged in a row in adjoining side-by-side relation and each including plural tiers of cassette storage compartments for containing respective tape cassettes;

a cassette transfer device for each of the cassette storage shelf blocks adapted to selectively insert and remove a tape cassette in each of the cassette storage compartments of the respective cassette storage shelf block and to transfer each removed tape cassette in vertical and horizontal directions through distances corresponding to the extent of the respective cassette storage shelf block in said directions;

a video tape recorder housing block mounted adjacent an end of said row of the cassette storage shelf blocks and containing at least one video tape recorder adapted to at least reproduce signals recorded in a tape cassette delivered thereto from one of the cassette storage shelf blocks;

a cassette delivery unit provided between each two adjoining side-by-side cassette storage shelf blocks and occupying the spaces of two of said cassette storage compartments in the respective two adjoining side-by-side cassette storage shelf blocks, each said cassette delivery unit being operative to deliver a tape cassette from one to another of the cassette transfer devices associated with said respective two adjoining cassette storage shelf blocks; and an additional cassette delivery unit provided between said video tape recorder housing block and the cassette storage shelf block adjacent thereto and occupying the space of one of said cassette storage compartments in said adjacent cassette storage shelf block and a similar space in said video tape recorder housing block, said additional cassette delivery unit being operative to deliver a tape cassette between said adjacent cassette storage shelf block and said at least one video tape recorder;

each of said cassette delivery units including a feed table shiftable in a direction along said row between first and second positions situated within said spaces occupied in the associated blocks, respectively, and said feed table being operative to receive and to discharge a tape cassette.

6. An automatic tape cassette loading device according to claim 5; in which said feed table includes a first plate and a second plate arranged side-by-side and having respective edges remote from each other with rims therealong extending parallel with the direction of the shifting of said table, said first plate being slidable toward and away from said second plate at right angles to said rims, spring means for urging said first plate toward said second plate, latch means for holding said first plate against movement by said spring means at a cassette receiving position in which a tape cassette can be accomodated between said rims, means for mounting said second plate for rocking between a raised position in which the rim on said second plate is engageable with a cassette lying flat on said first plate and a depressed position in which said rim on the second plate is released from a cassette, and means for moving said second plate to said depressed position simultaneously with release of said latch means so that said spring means discharges a cassette from said feed table to a respective one of said cassette transfer devices by moving said first plate toward said second plate while said second plate is rocked to said depressed position.

7. An automatic tape cassette loading device according to claim 6; in which said latch means includes a pivoted operating lever having an abutment thereon engageable in front of a projection on said first plate in said cassette receiving position, and said means for moving said second plate includes a cam member connected with said operating lever and engageable from above by said second plate for holding the latter in said raised position when said abutment engages said projection and for permitting rocking of said second plate to said depressed position when said operating lever is pivoted to disengage said abutment from said projection.

8. An automatic tape cassette loading device according to claim 7; in which each of said cassette transfer devices includes a transfer member defining a cassette receiving passage open at its ends, and means for propelling a cassette out of said passage and onto said first plate of the feed table while said second plate is in said depressed position so that the propelled cassette acts against said rim on the first plate for urging the latter to said cassette receiving position; and in which said feed table further includes means for urging said operating lever to move in the direction engaging said abutment in front of said projection when said first plate is moved to said cassette receiving position by the propelled cassette.

9. An automatic tape cassette loading device according to claim 8; in which said video tape recorder housing block further includes cassette input and output means interposed between each said video tape recorder and the respective additional cassette delivery unit and being operative selectively to propel a cassette therethrough in the direction from said respective additional cassette delivery unit to the respective video tape recorder for loading in the latter and to propel a cassette ejected from said respective video tape recorder through said cassette input and output means in the direction toward said respective additional cassette delivery unit for reception by said feed table of the latter.

10. An automatic tape cassette loading device according to claim 9; in which said cassette input and output means includes a drive roll disposed below a path of the tape cassette between said respective delivery unit and video tape recorder, means mounting said drive roll for vertical movements toward and away from said path, spring means for urging said drive roll upwardly against the bottom surface of a cassette in said path, first reversible motor means for rotating said drive roll, a rotatable shaft extending across said path above said drive roll, radial arms fixed to said shaft to turn with the latter between a raised inoperative position above said path and a lowered position interposed in said path, cam means fixed to said shaft for controlling the vertical position of said drive roll in accordance with rotation of said shaft, and second reversible motor means for turning said shaft.

11. An automatic tape cassette loading device according to claim 10; in which said cassette input and output means further includes a position indicating element rotating with said shaft, and sensor means detecting said position indicating element in several rotational positions of said arms and cam means for controlling said first and second motor means.

* * * * *